(12) United States Patent
Takayama et al.

(10) Patent No.: US 7,227,320 B2
(45) Date of Patent: Jun. 5, 2007

(54) DISC DRIVE APPARATUS AND MOTOR DRIVER CIRCUIT

(75) Inventors: Seiryu Takayama, Tokyo (JP); Kouya Koba, Kanagawa (JP)

(73) Assignee: Sony Corporation, Tokyo (JP)

( * ) Notice: Subject to any disclaimer, the term of this patent is extended or adjusted under 35 U.S.C. 154(b) by 126 days.

(21) Appl. No.: 11/149,653

(22) Filed: Jun. 10, 2005

(65) Prior Publication Data

US 2005/0280379 A1 Dec. 22, 2005

(30) Foreign Application Priority Data

Jun. 14, 2004 (JP) ............................. 2004-176149

(51) Int. Cl.
*H02P 6/18* (2006.01)
*G11B 19/28* (2006.01)
(52) U.S. Cl. ..................... 318/254; 318/138; 369/53.3
(58) Field of Classification Search ..................... None
See application file for complete search history.

(56) References Cited

U.S. PATENT DOCUMENTS

| | | | | | |
|---|---|---|---|---|---|
| 5,473,232 | A | * | 12/1995 | Tamaki et al. | 318/439 |
| 6,087,948 | A | * | 7/2000 | Oveby et al. | 340/635 |
| 6,163,120 | A | * | 12/2000 | Menegoli | 318/254 |
| 6,239,572 | B1 | * | 5/2001 | Tateishi | 318/605 |
| 6,566,827 | B2 | * | 5/2003 | Gotou et al. | 318/254 |
| 6,590,914 | B1 | * | 7/2003 | Tanase et al. | 372/38.02 |
| 6,597,140 | B2 | * | 7/2003 | Takayama et al. | 318/445 |
| 6,680,593 | B2 | * | 1/2004 | Gotou | 318/254 |
| 2005/0275362 | A1 | * | 12/2005 | Yamamoto et al. | 318/254 |

OTHER PUBLICATIONS

Patent Abstracts of Japan, Publication No. 2002-369575, Publication Date Dec. 20, 2002.
Patent Abstracts of Japan, Publication No. 2003-009580, Publication Date Jan. 10, 2003.

* cited by examiner

*Primary Examiner*—Lincoln Donovan
*Assistant Examiner*—Eduardo Colon Santana
(74) *Attorney, Agent, or Firm*—Frommer Lawrence & Haug LLP; William S. Frommer

(57) ABSTRACT

A motor driver circuit according to the present invention comprises an edge signal generation means for generating an edge signal indicating the timing of phase-switching according to the values of a plurality voltages induced when driving the motor and a drive voltage control means for controlling the highest value of the drive voltage for driving the motor according to the edge signal. The drive voltage control means includes a first drive voltage control means for controlling the highest value of the drive voltage before the timing of phase-switching and a second drive voltage control means for controlling the highest value of the drive voltage after the timing of phase-switching. With this arrangement, it is possible to realize soft switching control while the motor is driven to rotate at high speed and reduce the noise due to the motor being driven to rotate.

12 Claims, 20 Drawing Sheets

DISC DRIVE APPARATUS AND MOTOR DRIVER CIRCUIT

CROSS REFERENCES TO RELATED APPLICATIONS

The present invention contains subject matter related to Japanese Patent Application JP 2004-176149 filed in the Japanese Patent Office on Jun. 14, 2004, the entire contents of which being incorporated herein by reference.

BACKGROUND OF THE INVENTION

1. Field of the Invention

This invention generally relates to the technology of driving a motor to rotate by means of a direct PWM (pulse width modulation) system. More specifically, it relates to a technique of reducing the noise of a motor for rotating a disc by means of a direct PWM system in a disc drive apparatus for driving a disc mounted in it.

2. Description of the Related Art

Noises arise to give rise to problems in apparatus such as portable MD (Mini Disc: tradename) apparatus comprising a rotary drive system for driving a disc to rotate when the spindle motor of the rotary drive system is operated. Particularly, in the case of the PWM (pulse width modulation) system of directly supplying a pulse wide modulation signal to a spindle motor and driving the motor to rotate, noises that arise due to abrupt fluctuations of electric current at the time of a phase-switching action give rise to serious problems.

The applicant of the present patent application has proposed a technique of reducing noises by means of a soft-switching drive (control) system of reducing the electric current flowing to a spindle motor before and after a phase-switching action for the rotary drive control of the spindle motor, using such a direct PWM system (see Patent Document 1: Japanese Patent Application Laid-Open Publication No. 2002-369575).

The Patent Document 1 of the applicant of this patent application makes it possible to realize soft switching control by means of a digital circuit, which has hitherto been realized only by an analog circuit, by generating an edge signal to indicate the timing of phase-switching according to the voltage that is induced when a spindle motor is driven and controlling the highest value of the drive voltage for driving the motor according to the edge signal.

Additionally, the applicant of the present patent application disclosed a technique of appropriately controlling the revolutions of a spindle motor by selectively supplying a first timing signal indicating a timing that is computationally determined according to the phase differences of a plurality of drive signals for driving the motor and a second timing signal computationally determined according to the cycle period of one of the drive signals to the drive system in accordance with the rotary speed of the spindle motor at the time of driving the spindle motor to rotate by the direct PWM system (see Patent Document 2: Japanese Patent Application Laid-Open Publication No. 2003-9580).

However, if soft switching control is used when driving a spindle motor to rotate by means of a direct PWM system as disclosed in the Patent document 1 and, for instance, the master clock frequency of the motor control circuit of the motor is held low in order to suppress the power consumption rate while the spindle motor is driven to rotate at a high rate, there arise various problems including that the soft switch control is incomplete and the noise of the motor cannot be reduced significantly and that the PWM control is incomplete and it is not possible to supply an electric current at a rate sufficient for driving the spindle motor at high speed.

While the technique of the Patent Document 2 can be used to appropriately control the operation of driving a spindle motor to rotate by switching the mode of operation according to the rotary speed of the spindle motor (a mode for using a first timing signal and a mode for using a second timing signal), it is accompanied by a problem that it is not compatible with soft switching control for reducing the noise of the spindle motor.

SUMMARY OF THE INVENTION

In view of the above identified circumstances, it is therefore desirable to provide a motor driver circuit of a spindle motor that can avoid a reduced effect of soft switching control due to high speed revolutions of the motor and incomplete direct PWM control due to the power supply shortage that arises as a result of high speed revolutions of the motor and, at the same time realize soft switching control when direct PWM control is selected by switching the mode of operation according to the rotary speed of the motor and also a disc drive apparatus mounted by such a motor driver circuit.

According to the present invention, there is provided a disc drive apparatus for driving a disc mounted on it to rotate by means of a motor, the apparatus comprising: an edge signal generation means for generating an edge signal indicating the timing of phase-switching according to the values of a plurality voltages induced when driving the motor; and a drive voltage control means for controlling the highest value of the drive voltage for driving the motor according to the edge signal generated by the edge signal generation means; the drive voltage control means including as independent means: a first drive voltage control means for controlling the highest value of the first drive voltage before the timing of phase-switching indicated by the edge signal; and a second drive voltage control means for controlling the highest value of the second drive voltage after the timing of phase-switching indicated by the edge signal.

According to the present invention, there is also provided a disc drive apparatus for driving a disc mounted on it to rotate by means of a motor, the apparatus comprising: a plurality of timing signal generation means for generating respectively a plurality of different timing signals for determining timings of phase-switching the motor; and a drive voltage control means for controlling the highest values of the drive voltages for driving the motor respectively according to the plurality of different timing signals generated respectively by the plurality of timing signal generation means.

According to the present invention, there is provided a motor driver circuit comprising: an edge signal generation means for generating an edge signal indicating the timing of phase-switching according to the values of a plurality voltages induced when driving the motor; and a drive voltage control means for controlling the highest value of the drive voltage for driving the motor according to the edge signal generated by the edge signal generation means; the drive voltage control means including as independent means: a first drive voltage control means for controlling the highest value of the first drive voltage before the timing of phase-switching indicated by the edge signal; and a second drive voltage control means for controlling the highest value of the second drive voltage after the timing of phase-switching indicated by the edge signal.

According to the present invention, there is also provided a motor driver circuit comprising: a plurality of timing signal generation means for generating respectively a plurality of different timing signals for determining timings of phase-switching the motor; and a drive voltage control means for controlling the highest values of the drive voltages for driving the motor respectively according to the plurality of different timing signals.

Thus, according to the present invention, the first drive voltage control means controls the highest value of the first drive voltage before the timing of phase-switching and the second drive voltage control means controls the highest value of the second drive voltage after the timing of phase-switching so that consequently it is possible to reliably realize soft switching control when driving the motor at high speed. Thus, it is possible to reliably reduce noises produced as a result of driving the motor to rotate.

According to the present invention, the down-counting means of the first drive voltage control means controls the largest value of the first drive voltage by counting a plurality of counts per clock of a predetermined clock frequency and the up-counting means of the second drive voltage control means controls the largest value of the second drive voltage by counting a plurality counts per clock of a predetermined frequency. Thus, with this time, it is possible to hold the clock frequency of the circuit low when the motor is driven to rotate at high speed and, at the same time reduce the noise that arises as a result of soft switching control when the motor is driven to rotate at high speed.

A motor driver circuit according to the invention comprises a plurality of timing signal generation means for generating respectively a plurality of different timing signals for determining timings of phase-switching the motor and a drive voltage control means for controlling the highest values of the drive voltages for driving the motor respectively according to the plurality of different timing signals. Thus, if motor driver circuits according to the invention are manufactured with variances in the manufacturing process, each circuit can drive a motor appropriately to accommodate the variance and realize soft switching control when driving the motor to rotate so that it is possible to reliably reduce the noise of the motor.

DETAILED DESCRIPTION OF THE PREFERRED EMBODIMENTS

Now, the present invention will be described by referring to the accompanying drawings that illustrate a preferred embodiment of the invention. It should be noted here, however, that the present invention is by no means limited to the embodiment illustrated and described herein, which may be modified and altered in various different ways without departing from the scope of the present invention. Throughout the drawings that referred to in the following description, the same components are denoted respectively by the same reference symbols and, unless necessary, will not be described repeatedly.

[Disc Drive Apparatus]

Firstly, an embodiment of disc drive apparatus according to the invention will be described by referring to FIG. 1. The disc drive apparatus is adapted to receive a disc 1, which is an information recording medium such as MD (Mini Disc: tradename) to be mounted in it and reproduce the information recorded on the disc 1 mounted in it.

Figure 1:
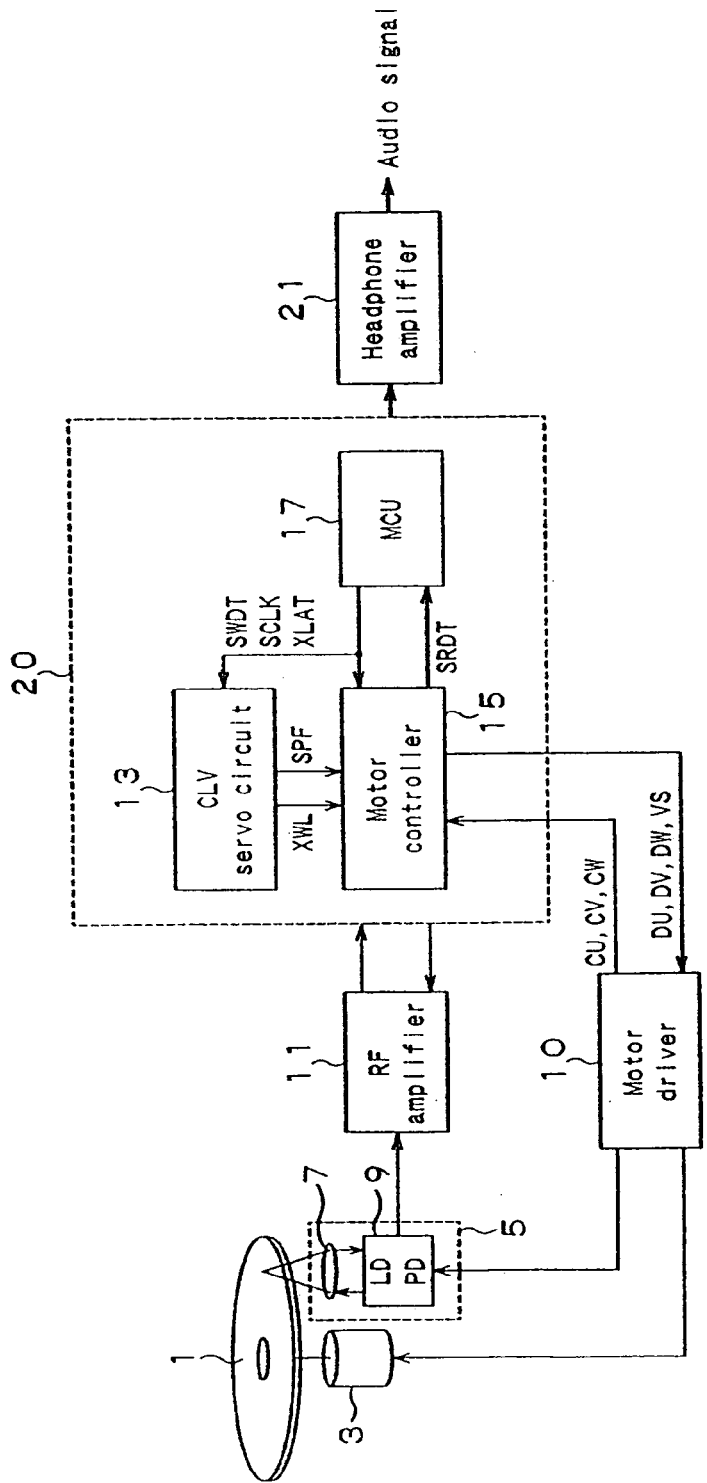
FIG. 1 is a schematic block diagram of an embodiment of disc drive apparatus according to the invention.

As shown in FIG. 1, the disc drive apparatus comprises a spindle motor 3 for driving the disc 1 to rotate, a read section 5 for reading the signals recorded on the disc 1, a motor driver 10, an RF amplifier 11, a system LSI (large scale integration) 20 and a head phone amplifier 21.

The read section 5 includes a pickup 7 and an element section 9 having a laser diode (LD) and a photo-detector IC (PD).

The spindle motor 3 is a brushless 3-phase motor that does not have any Hall element for detecting the rotary position of the motor. The spindle motor 3 is driven by the motor driver 10 according to the signal supplied by the system LSI 20. The spindle motor 3 will be described in greater detail hereinafter.

The system LSI 20 is a control section for comprehensively controlling the disc drive apparatus. More specifically, the system LSI 20 comprehensively controls the signal processing system (not shown) for processing the signals read out from the disc 1 and the drive processing system for controlling the operation of driving the spindle motor 3 and that of driving the read section 5 by means of the CLV (constant linear velocity) servo circuit 13, the motor controller 15 and the MCU (micro computer unit) 17 illustrated in FIG. 1.

The CLV servo circuit 13 of the system LSI 20 generates signal SPF by executing a pulse width modulation (PWM) process according to signals SWDT, SCLK, XLAT supplied from the MCU 17 and supplies it to the motor controller 15. The CLV servo circuit 13 also generates signal XWL and supplies it to the motor controller 15.

The motor controller 15 is controlled by signals SWDT, SCLK, XLAT supplied from the MCU 17 so as to generate drive voltage VS for driving the spindle motor 3 according to signal SPF supplied from the CLV servo circuit 13 and supply it to the motor driver 10. Additionally, the motor controller 15 generates logic drive signals DU, DV, DW for controlling the spindle motor 3 and supplies them to the motor driver 10. The configuration of the motor controller 15 will be described in greater detail hereinafter.

The motor driver 10 generates the electric current for controlling the operation of the spindle motor 3 and also the electric current for controlling the operation of the read section 5 according to the signals supplied from the motor controller 15. More specifically, motor driver 10 generates the electric current for driving the spindle motor 3 according to the logic drive signals DU, DV, DW and the drive voltage VS that are supplied from the motor controller 15 of the system LSI 20 and supplies it to the spindle motor 3 and also generates signals CU, CV, CW for indicating the rotary position of the motor and supplies them to the motor controller 15. The configuration of the functional section of the motor driver 10 for driving the spindle motor 3 will be described in greater detail hereinafter.

In the disc drive apparatus having the above described configuration, the RF amplifier 11 amplifies the signal detected by the photo-detector IC of the element section 9 of the read section 5 and the system LSI 20 carries out a predetermined processing operation on the signal. The disc drive apparatus then amplifies the signal processed by the system LSI 20 by means of the headphone amplifier 21 and outputs it as audio signal.

[Motor Driver 10]

Figure 2:
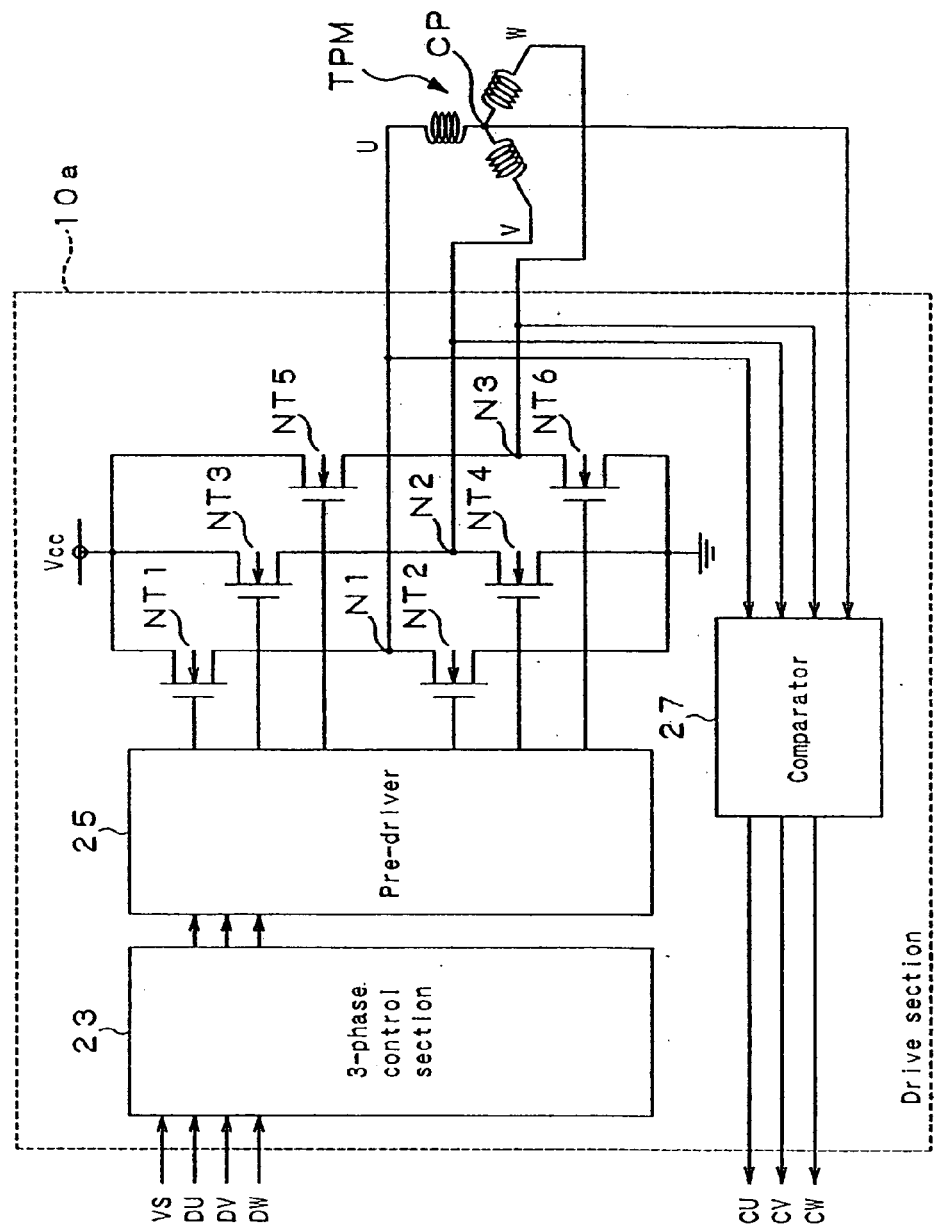
FIG. 2 is a schematic circuit diagram of the motor driver of the embodiment of disc drive apparatus of FIG. 1.

Now, the drive section 110a of the motor driver 10 for driving the spindle motor 3 will be described by referring to FIG. 2. As shown in FIG. 2, the drive section 10a includes a 3-phase control section 23, a pre-driver 25, a comparator 27 and N-channel MOS transistors NT1 through NT6.

The 3-phase control section 23 determines the direction of the electric current for driving motor TPM according to the logic drive signals DU, DV, DW and the drive voltage VS supplied from the motor controller 15 and supplies a signal indicating the direction of the electric current to the pre-driver 25. In FIG. 2, the motor TPM shown outside the drive section 10a refers a motor armature coil (stator) contained in the spindle motor 3 shown in FIG. 1.

The pre-driver 25 decodes the signal supplied from the 3-phase control section 23 and selectively applies a voltage not lower than a threshold voltage to the gates of the N-channel MOS transistors NT1 through NT6.

The paired N-channel MOS transistors NT1, NT2, the paired N-channel MOS transistors NT3, NT4 and the paired N-channel MOS transistors NT5, NT6 are connected in series between supply voltage node Vcc and grounding node and the gate of each of the N-channel MOS transistors NT1 through NT6 is connected to the pre-driver 26.

Thus, as a voltage is selectively applied to the gates of the N-channel MOS transistors NT1 through NT6 from the pre-driver 25, the N-channel MOS transistors NT1 through NT6 are selectively turned on. As a result, the electric potential of the intermediate node N1 arranged between the paired N-channel MOS transistors NT1, NT2, that of the intermediate node N2 arranged between the paired N-channel MOS transistors NT3, NT4 and that of the intermediate node N3 arranged between the paired N-channel MOS transistors NT5, NT6 are regulated so that an electric current of a predetermined direction is supplied to the motor TPM. The spindle motor 3 is driven to rotate as an electric current is supplied to the motor TPM in a predetermined direction.

The comparator 27 compares the voltage of each of the phases (the electric potentials of the intermediate nodes N1 through N3) and the electric potential of the center point CP of the motor TPM and generates signals CU, CV, CW indicating the rotary position of the motor. The signals CU, CV, CW generated by the comparator 27 are supplied to the motor controller 15.

Figure 3:
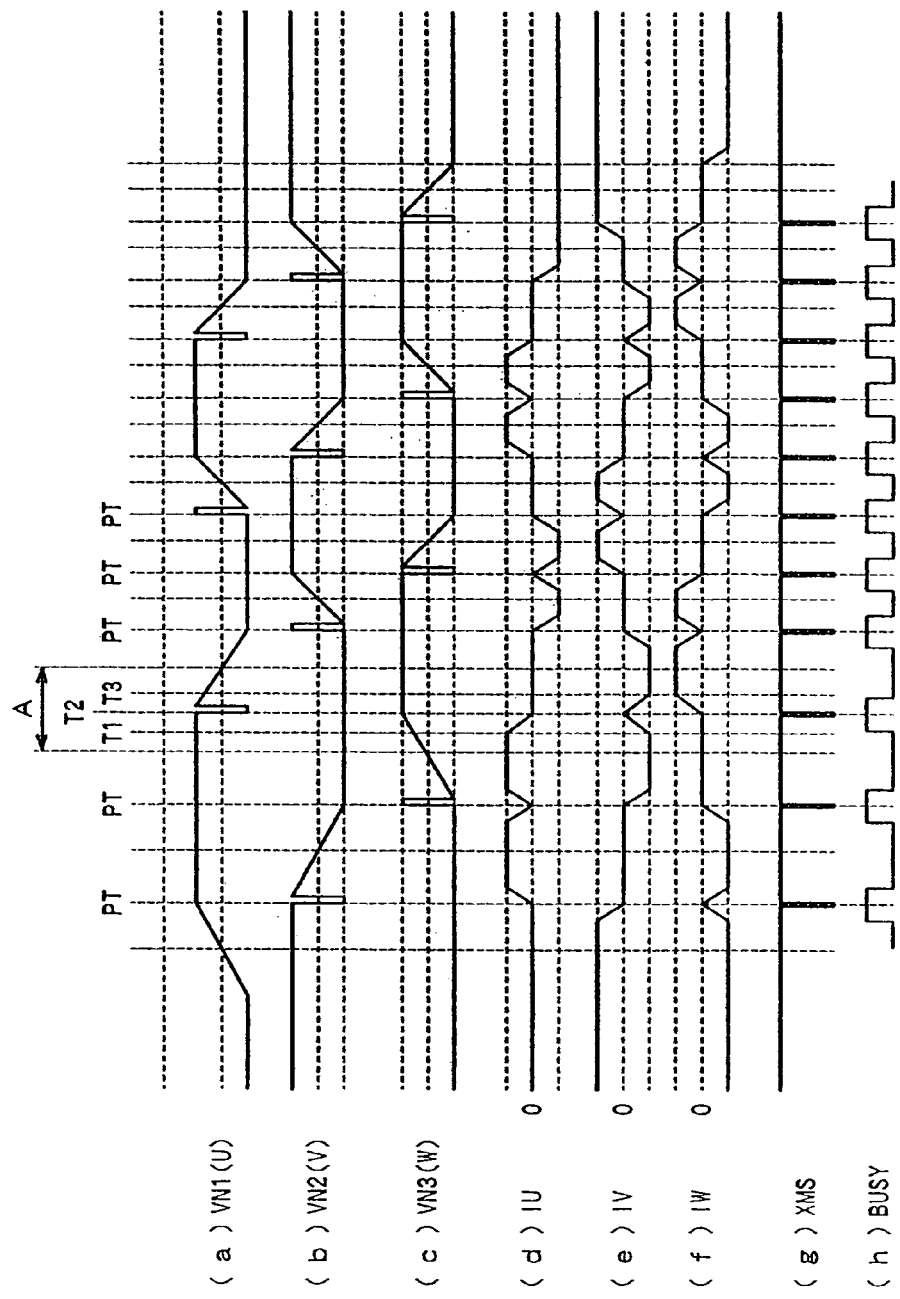
FIG. 3 is a timing chart of the operation of the motor driver of FIG. 2.

The drive section 10a having the above described configuration drives the motor TPM of the spindle motor 3 to rotate according to the timing chart illustrated in FIG. 3.

In FIG. 3, (a), (b) and (c) respectively show the electric potentials VN1, VN2, VN3 of the intermediate N1, N2, N3 and (d), (e) and (f) respectively show the levels of the electric currents IU, IV, IW that flow to the center point CP by way of the intermediate nodes N1, N2, N3 respectively. In FIG. 3, (g) shows mask set signal XMS generated by phase-switching section 33 of the motor controller 15, which will be described in greater detail hereinafter and (h) shows signal BUSY that indicates the periods during which the level of the drive voltage VS generated in the motor controller 15 changes. The mask set signal XMS shown in (g) and the signal BUSY shown in (h) of FIG. 3 will be described in greater detail hereinafter.

As seen from (a), (b) and (c) of FIG. 3, a spike voltage is generated at points where phase-switching that is indicated by PT takes place.

Figure 4:
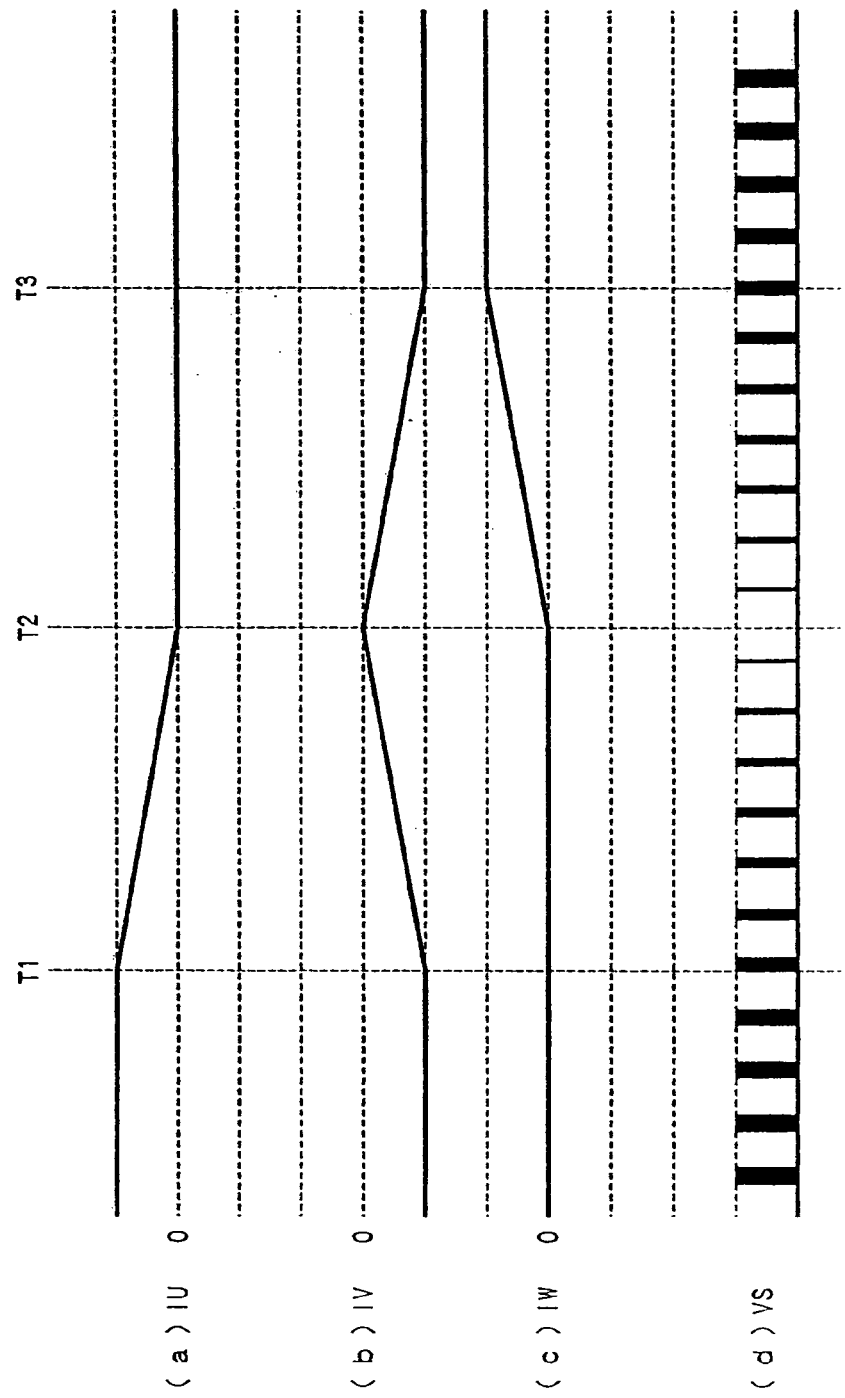
FIG. 4 is an enlarged timing chart of the region A of FIG. 3.

FIG. 4 is an enlarged timing chart of the region A of FIG. 3. It shows the electric currents IU, IV, IW at time points T1 through T3 and their vicinities along with the drive voltage VS. As seen from FIG. 4, the motor controller 15 holds a high-impedance (Hi-Z) phase down to the time when phase-switching takes place in the motor TPM. As a result, the electric current IW is made equal to 0 from time point T1 to time point T2, whereas the electric current IU is made equal to 0 from time point T2 to time point T3.

As shown in (a) of FIG. 4, the electric current IU that flows from the intermediate node N1 to the center point CP is decreased from the time point T1, when soft switching is started, and made equal or close to 0 at the time point T2, when phase-switching takes place. As phase-switching takes place at time point T2, the electric current IW that flows from the center point CP to the intermediate node N3 is gradually increased to the time point T3, when soft switching is terminated as shown in (c) of FIG. 4.

In FIG. 4, (d) shows the drive voltage VS generated by the motor controller 15 in the pulse width modulation format. It will be seen from (d) that the drive voltage VS is gradually decreased from the time point T1 to the time point T2 but gradually increased from the time point T2 to the time point T3.

[Motor Controller 15]

Figure 5:
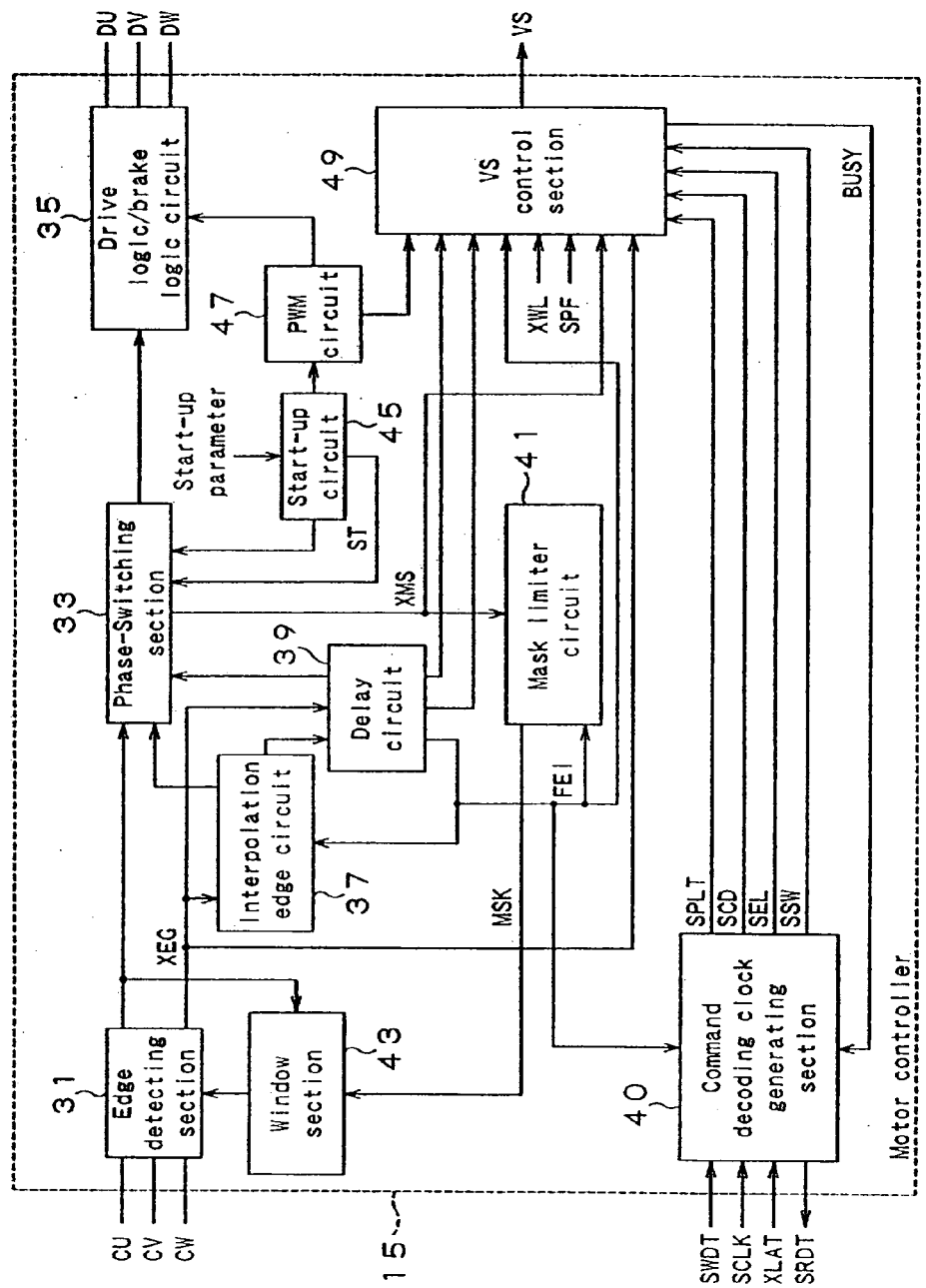
FIG. 5 is a schematic block diagram of the motor controller of the disc drive apparatus of FIG. 1.

Now, the motor controller 15 will be described by referring to FIG. 5. As shown in FIG. 5, the motor controller 15 includes an edge detecting section 31, a phase-switching section 33, a drive logic/brake logic circuit 35, an interpolation edge circuit 37, a delay section 39, a command decoding clock generating section 40, a mask limiter circuit 41, a window section 43, a start-up circuit 45, a PWM circuit 47 and a VS control section 49.

Figure 6:
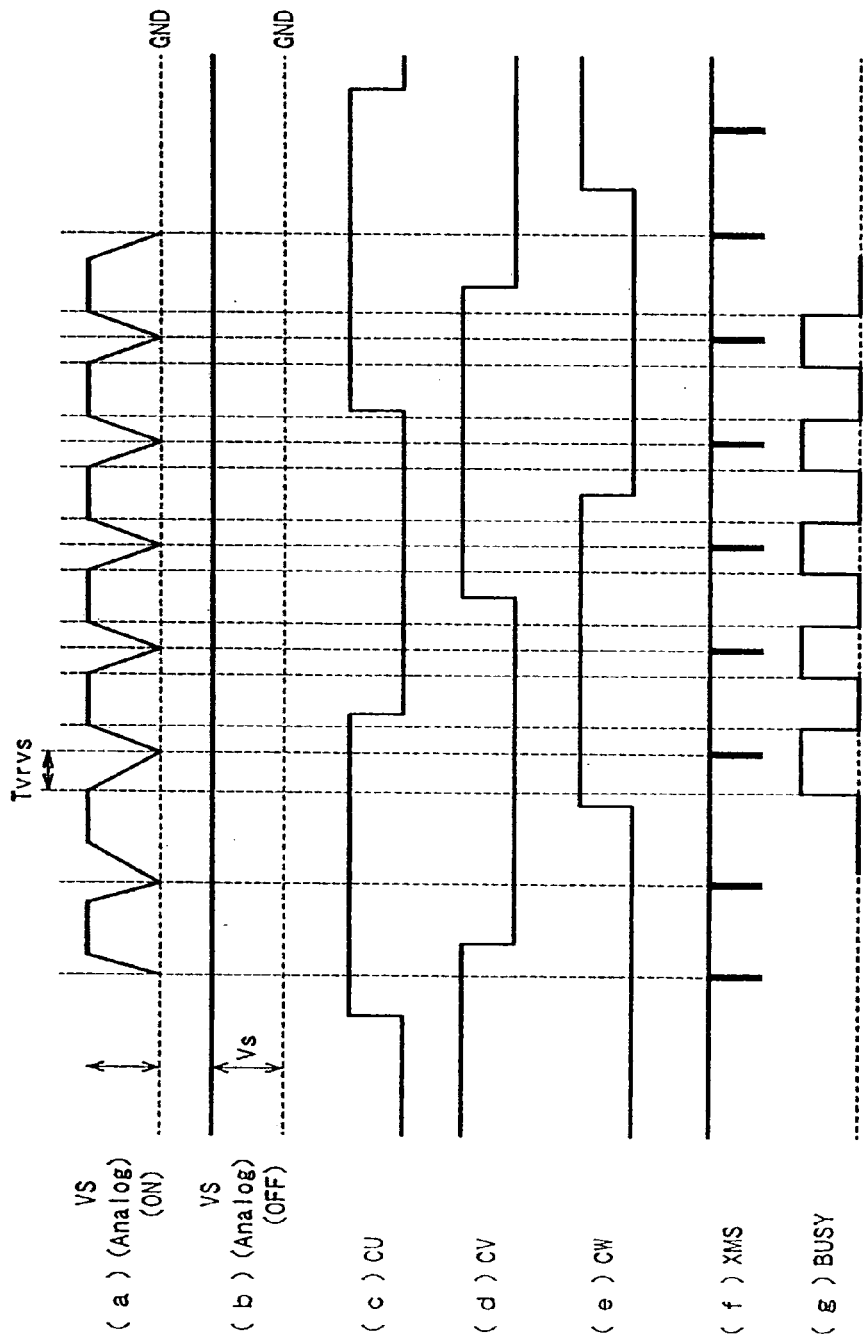
FIG. 6 is a timing chart of the operation of the motor controller of FIG. 5.

The edge detecting section 31 detects the timing (edge) when the logic level of each of the signals CU, CV, CW supplied from the comparator 27 of the drive section 10a of the motor driver 10 of FIG. 2 becomes transitional and generates an edge detection signal XEG In FIG. 6, (c), (d) and (e) show signals CU, CV, CW that are typically supplied to the edge detecting section 31.

The delay section 39 computes the delay time that is required for computationally determining the timing of phase-switching according to the edge detection signal XEG generated by the edge detecting section 31 and generates an edge interval signal FEI that represents the rotary speed of the spindle motor 3. The delay section 39 will be described in greater detail hereinafter.

The interpolation edge circuit 37 supplies an edge detection signal to the phase-switching section 39 and the delay 39 so as to interpolates an edge according to the edge detection signal XEG supplied from the edge detecting section 31 and the edge interval signal FEI supplied from the delay section 39 in order to prevent the spindle motor 3 from going out of order when the edge detecting operation of the edge detecting section 31 is not accurate and make the spindle motor 3 keep on revolving properly.

The phase-switching section 33 generates a mask set signal XMS that indicates the timing of phase-switching of the motor TPM according to the signals supplied from the edge detecting section 31 and the interpolation edge circuit 37 and the delay time as determined by the delay section 39 and supplies it to the mask limiter circuit 41 and the VS control section 49. At the same time, the phase-switching section 33 supplies a control signal for controlling the rotary motion of the spindle motor 3 to the drive logic/brake logic circuit 35. The phase-switching section 33 generates a mask set signal XMS typically as illustrated in (g) of FIG. 3 and in (f) of FIG. 6.

The start-up circuit 45 generates a start signal ST and a phase-switching signal according to the start-up parameters supplied to it for starting the spindle motor 3 and supplies the start signal ST to the phase-switching section 33. Additionally, the start-up circuit 45 supplies the phase-switching signal to the phase-switching section 33 and the PWM circuit 47.

The PWM circuit 47 generates a pulse width modulation (PWM) signal by carrying out an operation of pulse width modulation on the signal supplied from the start-up circuit 45.

The drive logic/brake logic circuit 35 is a circuit for accelerating or decelerating the rotary speed of the spindle motor 3 and generating logic drive signals DU, DV, DW according to the control signal supplied from the phase-switching section 33.

The mask limiter circuit 41 determines the mask time according to the edge interval signal FEI supplied from the delay section 39 and the mask set signal XMS supplied from the phase-switching section 33 and, at the same time, limit the rotary speed of the spindle motor 3 within a predetermined range. The mask limiter circuit 41 generates a mask signal MSK and supplies it to the window section 43.

The window section 43 generates a window signal according to the edge detection signal and the mask signal MSK supplied to it and supplies the window signal to the edge detecting section 31. The window signal is a pulse signal that shows the authorized state, or the unauthorized state, of edge detection. For example, an edge detection signal is output from the edge detecting section 31 only when the window signal is at a high level.

The command decoding clock generating section 40 generates a serial signal SRDT in response to the edge interval signal FEI supplied from the delay section 39 and the signal BUSY, which will be described in greater detail hereinafter, supplied from the VS control section 49 and supplies the serial signal SRDT to the MCU 17. At this time, the MCU 17 supplies the commands SWDT, SCLK, XLAT to the command decoding clock generating section 40, while monitoring the serial signal SRDT by executing related software. Then, the command decoding clock generating section 40 decodes the commands SWDT, SCLK, XLAT supplied from the MCU 17 and generates a largest value control signal SPLT, a selection signal SEL, a command signal SCD and a control switching signal SSW.

The VS control section 49 generates a drive voltage VS as shown by (a) or (b) in FIG. 6 according to the pulse width modulation signal supplied from the PWM circuit 47, the edge interval signal FEI supplied from the delay section 39, the signals SPF, XWL supplied from the CLV servo circuit 13, the mask set signal XMS supplied from the phase-switching section 33, the edge detection signal XEG supplied from the edge detecting section 31 and the largest value control signal SPLT, the selection signal SEL and the command signal SCD supplied from the command decoding clock generating section 40 and applies it to the motor driver 10.

The VS control section 49 reduces the largest value of the drive voltage VS at the phase-switching time according to the control switching signal SSW supplied from the command decoding clock generating section 40 and turns on/off the so-called soft switching control. More specifically, the VS control section 45 outputs a drive voltage VS as shown in (a) of FIG. 6 when a command for turning ON the soft switching control is supplied from the MCU 17 of the motor controller 15 but it outputs a drive voltage VS as shown in (b) of FIG. 6 when a command for turning OFF the soft switching control is supplied from the MCU 17 of the motor controller 15. Note that the drive voltages VS shown respectively in (a) and (b) of FIG. 6 are indicated in an analog format.

As described above, the VS control section 49 is a functional section that operates as a hub for realizing soft switching control by means of a digital circuit. The VS control section 49 will be described in greater detail hereinafter.

<Delay Section 39>

Figure 7:
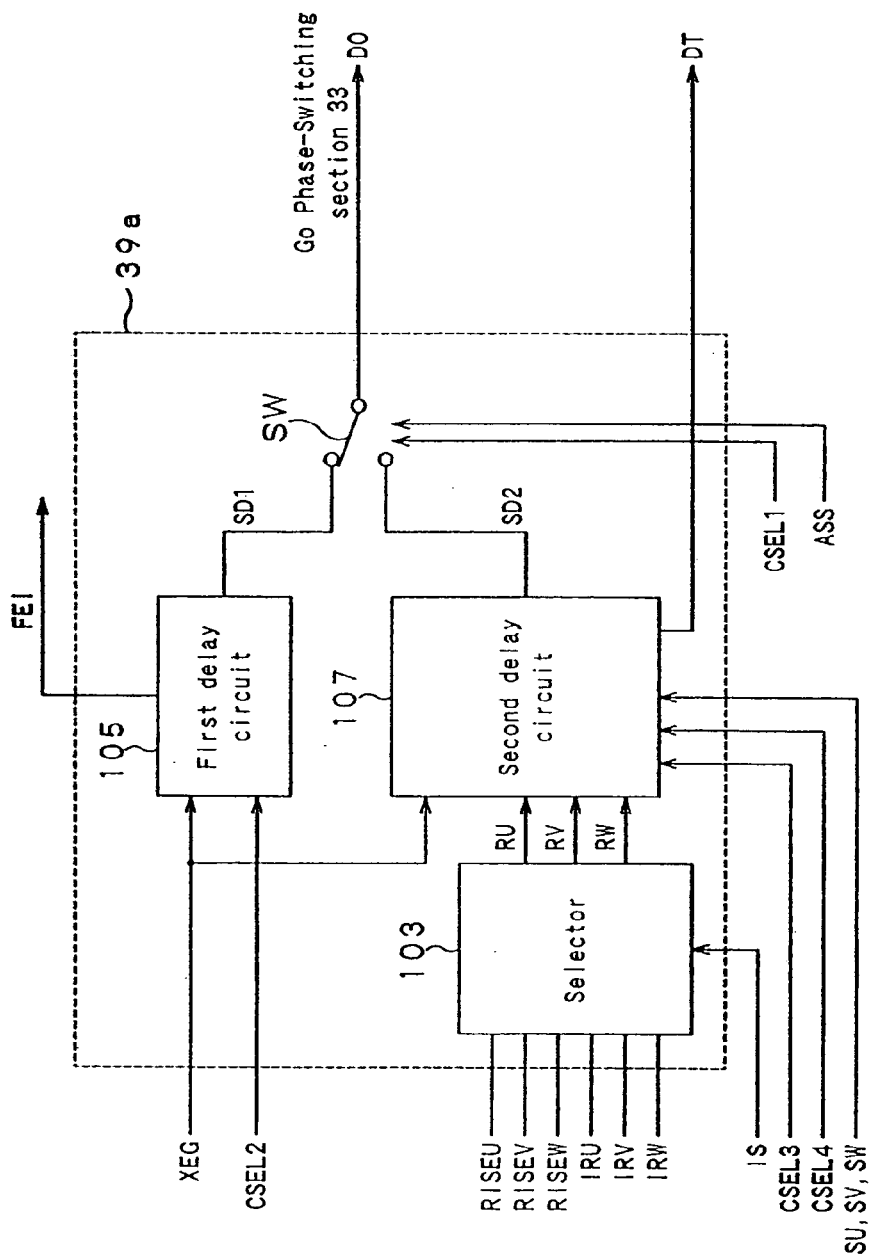
FIG. 7 is a schematic block diagram of the delay section of the motor controller of FIG. 5.

Now, the delay section 39 of the motor controller 15 will be described in detail below. The delay section 39 includes a delay circuit 39a as shown in FIG. 7. The delay circuit 39a by turn includes a selector 103, a first delay circuit 105, a second delay circuit 107 and a switching circuit SW.

The first delay circuit 105 generates an edge interval signal FEI according to the edge detection signal XEG supplied from the edge detecting section 31 and supplies it to the outside of the delay section 39 and, at the same time, it generates a phase-switching signal SD1 and supplies it to the switching circuit SW.

The edge interval signal FEI output from the delay section 39 is supplied to the interpolation edge circuit 37, the command decoding clock generating circuit 40, the mask limiter circuit 41 and the VS control section 49. The phase-switching signal SD1 is a signal for realizing control in the first delay mode.

The first delay mode is designed to control the motor by computing the rotary speed of the motor from the phase differences of a plurality inversely rising edge signals obtained from the rotary motion of the motor and determining the phase-switching timing.

The selector 103 receives signals RISEU, RISEV, RISEW from the edge detecting section 31 and interpolation signals IRU, IRV, IRW from the interpolation edge circuit 37 and selectively outputs either the set of signals RISEU, RISEV, RISEW or the set of interpolation signals IRU, IRV, IRW to the second delay circuit 107 as signals RU, RV, RW according to the selection signal IS supplied to it also from the interpolation circuit 37.

The second delay circuit 107 generates a phase-switching signal SD2 from the signals supplied to it from the selector 103 according to the command signal supplied from the command decoding clock generating section 40 and also a signal DT that represents the delay time since the detection of the inversely rising edge signal that provides the timing of phase-switching and supplies it to the command decoding clock generating section 40 and the VS control section 49.

The phase-switching signal SD2 is a signal for realizing control in the second delay mode. The signal DT is also supplied to the MCU 17 and used to monitor the number of revolutions per unit time of the motor.

The second delay mode is designed to control the motor by computing the rotary speed of the motor from a cycle of a single inversely rising edge signal, or the time interval between two inversely rising edges that corresponds to ¼ of a revolution.

The switching circuit SW selectively supplies either the phase-switching signal SD1 generated by the first delay circuit 105 or the phase-switching signal SD2 generated by the second delay circuit 107 to the phase-switching section 33 as signal DO according to the command selection signal CSEL1 supplied from the command decoding clock generating section 40 of the motor controller 15 according to the command issued from the MCU 17. The phase-switching section 33 controls the drive logic/brake logic circuit 35 according to the signal DO so as to have it generate logic drive signals DU, DV, DW.

Thus, the disc drive apparatus of this embodiment of the present invention can optimally control the operation of driving the spindle motor 3 to rotate according to the rotary speed of the spindle motor 3 as the MCU 17 issues a command that is defined according to the rotary speed of the spindle motor 3 because of the provision of the delay section 39, which has the above described configuration, in the motor controller 15.

Additionally, the mode of operation of the spindle motor 3 is switched according to the command issued from the MCU 17 and, therefore, it is possible to easily change the delay mode from the first delay mode to the second delay mode or vice versa as described above.

Thus, if motor drivers according to the invention are manufactured with variances in the manufacturing process that can give rise to defective control of the revolutions of the spindle motor, each of them can drive a motor appropriately to accommodate the defective control of the revolutions of the motor by switching from the first delay mode to the second delay mode or vice versa under the control of the MCU 17.

While either the first delay mode or the second delay mode is selected by the delay section 39 of this embodiment, the number of delay modes that can be selectively used for the purpose of the present invention is not limited to two and three or more than three delay modes may alternatively be provided.

<VS Control Section 49>

Figure 8:
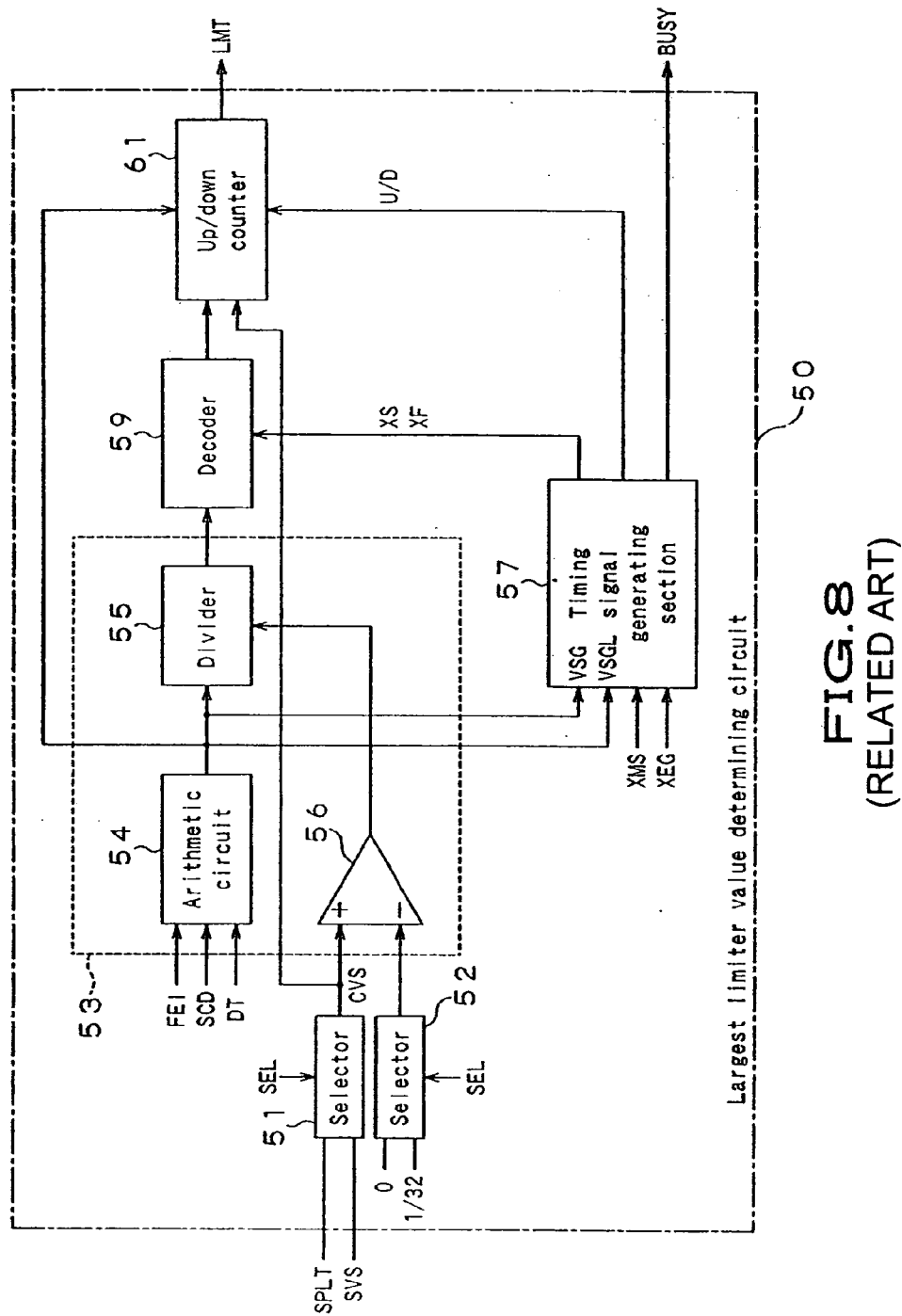
FIG. 8 is a schematic block diagram of the largest limiter value determining circuit of the VS control section of the motor controller of FIG. 5, illustrating the circuit configuration thereof.
Figure 20:
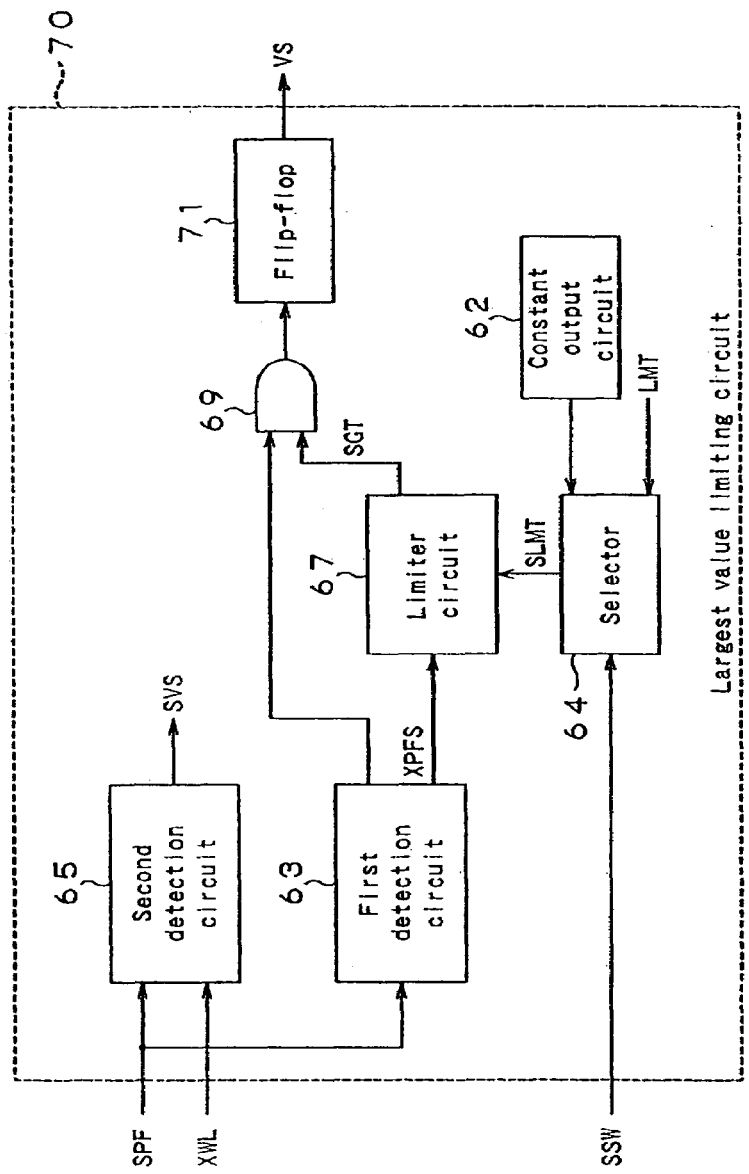
FIG. 20 is a schematic block diagram of the largest value limiting circuit of the VS control section of the motor controller of FIG. 5.

Now, the VS control section 49 of the motor controller 15 will be described in detail below. The VS control section 49 includes a largest limiter value determining circuit 50 as shown in FIG. 8 and a largest value limiting circuit 70 as shown in FIG. 20.

The largest limiter value determining circuit 50 controls the pulse width modulation according to the switching timing of the spindle motor 3. In other words, it suppresses the flow rate of the electric current flowing to the spindle motor 3 at the time of phase-switching by making the duty ratio of the pulse width modulation equal to 0 before and after the phase-switching operation in order to reduce the fluctuations in the electric current that are produced by the phase-switching. As a result, it is possible to suppress the attractive force/repulsive force that will be generated between the rotor and the stator of the spindle motor 3 and reduce the noise.

More specifically, the largest limiter value determining circuit 50 generates a control signal LMT (limiter value) for controlling the largest value limiting circuit 70.

On the other hand, the largest value limiting circuit 70 limits the largest value of the signal SPF supplied in the PWM format from the CLV servo circuit 13 according to the control signal LMT generated by the largest limiter value determining circuit 50 and outputs it as drive voltage VS to the motor driver 10.

((Largest Limiter Value Determining Circuit 50))

Firstly, the largest limiter value determining circuit 50 adapted to generate control signal LMT for controlling the largest value limiting circuit 70 will be described below by referring to FIG. 8. As shown in FIG. 8, the largest limiter value determining circuit 50 includes selectors 51, 52, an arithmetic operation section 53, a timing signal generating section 57, a decoder 59 and an up/down counter 61.

The selector 51 is supplied with the signal SPLT generated by the command decoding clock generating section 40 illustrated in FIG. 5 and the signal SVS generated by the second detection circuit 65 of the largest value limiting circuit 70 as shown in FIG. 20, which will be described hereinafter and outputs either the signal SPLT or the signal SVS to the positive terminal of the comparator 56 of the arithmetic operation section 53 and also to the up/down counter 61 according to the selection signal SEL generated by the command decoding clock generating section 40.

The selector 52 selectively supplies either numerical information of 0 or that of 1/32 to the negative terminal of the comparator 56 of the arithmetic operation section 53 according to the selection signal SEL generated by the command decoding clock generating section 40 on the basis of the duty ratio of the drive voltage VS generated by the VS control section 49.

The arithmetic operation section 53 includes an arithmetic circuit 54, a divider 55 and a comparator 56 and is adapted to compute parameters necessary for PWM trapezoid control.

The arithmetic circuit 54 of the arithmetic operation section 53 computes the delay time, or the soft switching time, that corresponds to the selected delay mode. The arithmetic circuit 54 generates signal VSG that indicates the transitional time Tvrvs of the drive voltage VS as shown in (a) of FIG. 6 and signal VSGL that indicates the difference between ½ of the edge interval signal FEI and the signal VSG according to the edge interval signal FEI and the signal DT supplied from the delay section 39 and the command signal SCD supplied from the command decoding clock generating section 40 and supplies them to the divider 55 and the timing signal generating section 57. The configuration of the arithmetic circuit 54 will be described in greater detail hereinafter.

The comparator 56 of the arithmetic operation section 53 compares the duty ratio CVS of the current drive voltage output from the selector 51 and the duty ratio of the target drive voltage VS and supplies a signal representing the outcome of the comparison to the divider 55.

The divider 55 of the arithmetic operation section 53 divides the signal VSG supplied from the arithmetic circuit 54 by the signal supplied from the comparator 56 and supplies the quotient and the residue produced as a result of the division to the decoder 59.

The timing signal generating section 57 generates signal XS that represents the timing of the start of a change in the duty ratio of the drive voltage (pulse width modulation signal) and a signal XF that represents the timing of the end of the change according to the signal VSG and the signal VSGL supplied to it and supplies the generated signals to the decoder 59. The timing signal generating section 57 generates the signals XS, XF by measuring the time from the detecting timing of an edge to the timing of the start of a fall of the drive voltage VS and the rising time of the drive voltage VS by means of a counter.

Additionally, the timing signal generating section 57 generates signal BUSY that indicates that the logic level of the drive voltage VS is changing and supplies it to the command decoding clock generating section 40 and also supplies signal U/D for controlling the largest value of the drive voltage VS to the up/down counter 61. The configuration of the timing signal generating section 57 will be described in greater detail hereinafter.

The decoder 59 decodes the signal XS supplied from the timing signal generating section 57 and the signal representing the quotient that is supplied from the divider 55 and generates a count signal that represents the timing of a change in the largest value of the drive voltage VS. Then, it supplies the count signal to the up/down counter 61.

The up/down counter 61 generates control signal LMT for controlling the largest value limiting circuit 70 according to the count signal, the duty ratio CVS and the signal U/D supplied to it and outputs the control signal. Thus, the largest limiter value of the drive voltage VS is determined by the control signal LMT. The configuration of the up/down counter 61 will be described in greater detail hereinafter.

(Arithmetic Circuit 54)

Figure 9:
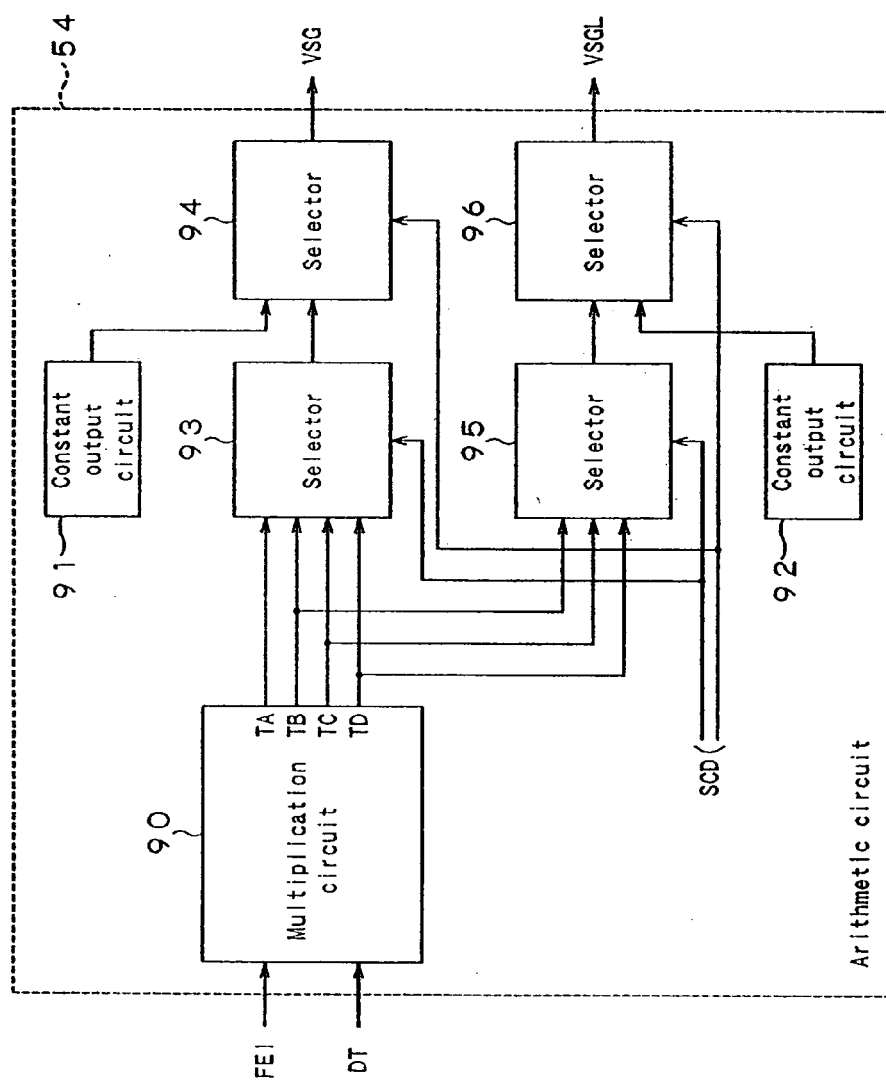
FIG. 9 is a schematic block diagram of the arithmetic circuit of the largest limiter value determining circuit of FIG. 8, illustrating the circuit configuration thereof.

Now, the configuration of the arithmetic circuit 54 will be described in detail by referring to FIG. 9. As described above, the arithmetic circuit 54 computationally determines the soft switching time to realize soft switching control according to the selected delay mode. As shown in FIG. 9, the arithmetic circuit 54 includes a multiplication circuit 90, constant output circuits 91, 92 and selectors 93 through 96. It is supplied with the edge interval signal FEI and the signal DT by the delay section 39 and also with the command signal SCD by the command decoding clock generating section 40.

The multiplication circuit 90 outputs a signal obtained by multiplying the edge interval signal FEI supplied from the delay section 39 of the motor controller 15 shown in FIG. 5 by ½ from terminal TA, a signal obtained by multiplying the edge interval signal FEI by ¼ from terminal TB, a signal obtained by multiplying the edge interval signal FEI by ⅛ from terminal TC and a signal obtained by multiplying the edge interval signal FEI by ⅜ from terminal TD. The multiplication circuit 90 additionally outputs a signal obtained by multiplying the signal DT also supplied from the delay section 39 and representing the delay time since the detection of an inversely rising edge signal that indicates the phase-switching timing by 1 from the terminal TA, a signal obtained by multiplying the signal DT by ½ from the terminal TB, a signal obtained by multiplying the signal DT by ¼ from the terminal TC and a signal obtained by multiplying the signal DT by ¾ from the terminal TD.

The constant output circuits 91, 92 respectively supply signals representing predetermined voltage values to the selectors 94, 96.

The selectors 93 through 96 are connected in such a way that the output of the selector 93 is input to the selector 94 and the output of the selector 95 is input to the selector 96. The selector 93 through 96 are adapted to selectively output the input signals according to the command signal SCD supplied from the command decoding clock generating section 40 of the motor controller 15 as shown in FIG. 5 so that ultimately the selector 94 and the selector 96 respectively output signal VSG and signal VSGL, which signal VSG and signal VSGL are then supplied respectively to the divider 55 and the timing signal generating section 57 as shown in FIG. 8.

The selectors 93 through 96 adjusts the transitional time Tvrvs as shown in FIG. 6 by modifying the magnitude of the signal VSG and that of the signal VSGL. While the transitional time Tvrvs is typically adjusted according to the rotary speed of the disc 1, it is held to a constant value when the selectors 94, 96 selectively output the signals supplied respectively from the constant output circuits 91, 92.

The arithmetic circuit 54 having the above described configuration is conventionally accompanied by a problem that the signal DT that is generated by the delay section 39 so as to represent the delay time is not supplied and, if the delay section 39 is made to have the above described configuration, it is not possible to realize soft switching control when the delay mode is switched according to the rotary speed of the spindle motor 3.

Figure 10:
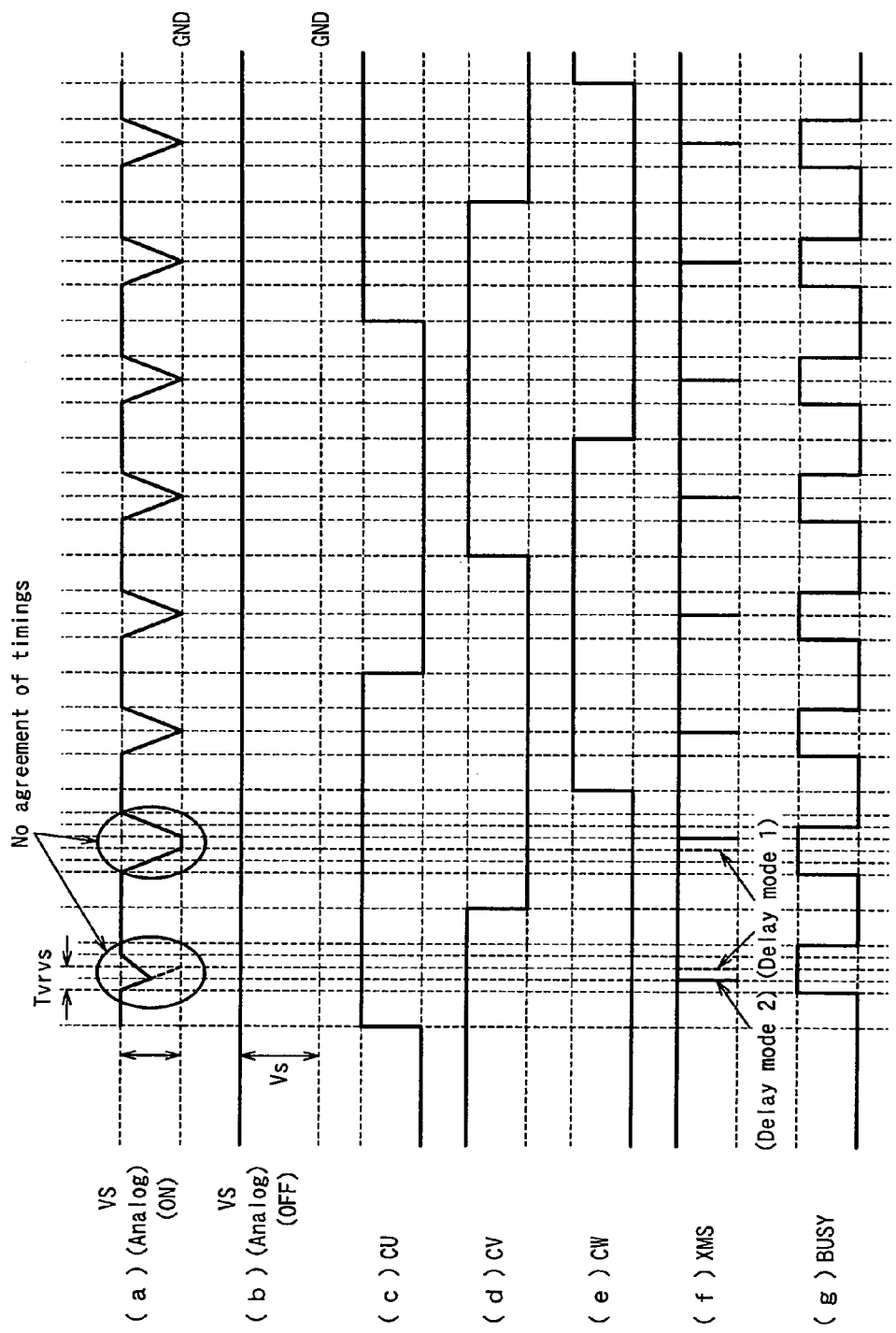
FIG. 10 is a timing chart illustrating the problems that arise in the soft switching control when the delay mode is changed in a known disc drive apparatus.

If signals CU, CV, CW as shown in (c), (d) and (e) of FIG. 10 are supplied from the motor driver 10 to the motor controller 15 and a command for controlling the spindle motor 3 so as to cause it to be driven to rotate in the second delay mode is issued from the MCU 17 when the signal DT is not supplied to the arithmetic circuit 54 and the above described arithmetic operations are not carried out, the mask set signal XMS generated by the phase-switching section 33 appears as shown in (g) of FIG. 10. However, conventionally, the soft switching time is not computed so as to correspond to the second delay mode and, since transitional time Tvrvs of the drive voltage VS is made to correspond to the first delay mode, the timing when the limiter value of the drive voltage VS shown in (a) of FIG. 10 for bringing the soft switching control into an ON state does not agree with the mask set signal XMS in (g) of FIG. 10 illustrating the timing of phase-switching so that it is not possible to realize appropriate soft switching control.

Figure 11:
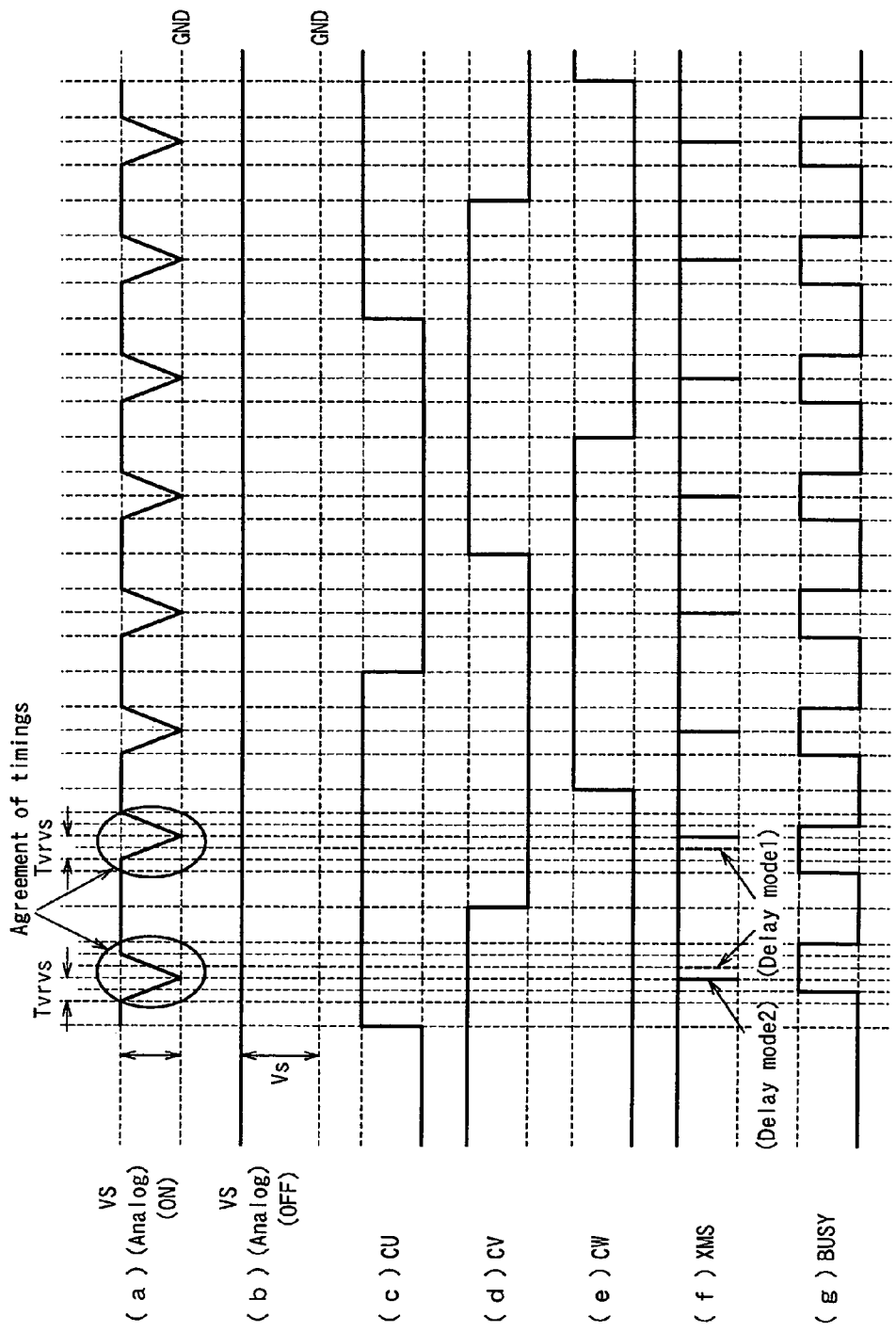
FIG. 11 is a timing chart illustrating the soft switching control that is realized when the delay mode is changed in the embodiment of disc drive apparatus of FIG. 1.

In this embodiment of disc drive apparatus according to the invention, on the other hand, the signal DT, which is a delay signal corresponding to the current delay mode, is supplied to the arithmetic circuit 54 and the transitional time Tvrvs of the drive voltage VS is computed as soft switching time by using this signal DT. Thus, if the mode is changed from the first display mode to the second delay mode and signals CU, CV, CW as shown in (c), (d), (e) of FIG. 11 are supplied from the motor driver 10 to the motor controller 15, the limiter value "0" of the drive voltage VS in (a) of FIG. 11 agrees with the mask set signal XMS as shown in (f) of FIG. 11 so that it is possible to reliably realize soft switching control.

Therefore, if motor drivers according to the invention are manufactured with variances in the manufacturing process that can give rise to defective control of the revolutions of the spindle motor and the motor driver switches from the first delay mode to the second delay mode or vice versa under the control of the MCU 17 in order to accommodate the defective control of the revolutions of the spindle motor, it is possible to realize soft switching control and hence reduce the noise of the spindle motor 3.

(Timing Signal Generating Section 57)

Figure 12:
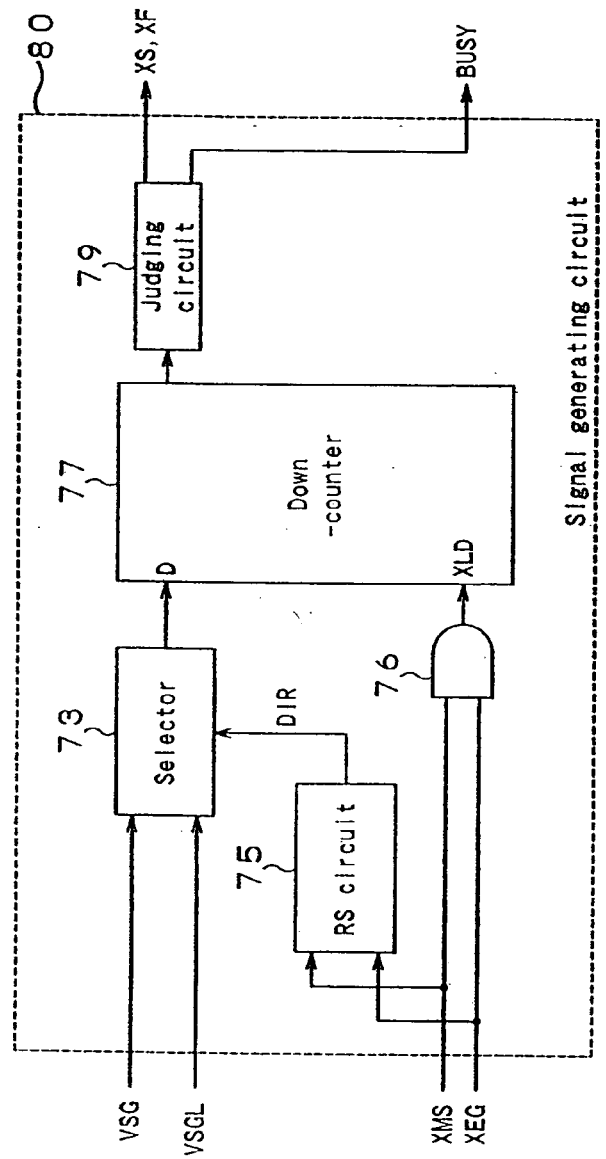
FIG. 12 is a schematic block diagram of the signal generation circuit of the timing signal generating section of the largest limiter value determining circuit of FIG. 8.

Now, the signal generating circuit 80 of the timing signal generating section 57, which has a configuration as illustrated in FIG. 8, will be described by referring to FIG. 12. As shown in FIG. 12, the signal generating circuit 80 includes a selector 73, an RS circuit 75, an AND circuit 76, a down-counter 77 and a judging circuit 79.

The RS circuit 75 generates a DIR signal that indicates the rise or fall of the drive voltage VS and supplies it to the selector 73.

The selector 73 selectively supplies the signal VSG or the signal VSGL supplied to it from the arithmetic circuit 54 of the largest limiter value determining circuit 50 as shown in FIG. 8 to the down-counter 77 according to the signal DIR supplied to it from the RS circuit 75.

The down-counter 77 counts the time from the timing of detection of an edge to the timing of the start of a fall of the drive voltage and the rising time of the drive voltage.

The judging circuit 79 that comprises a decoder judges if the reading of the down-counter 77 has reached a preset value or not. The judging circuit 79 generates signal XS that indicates the timing of the start of a change in the duty ratio of the drive voltage and a signal XF that indicates the timing of the end of the change and outputs a signal BUSY as shown in (h) of FIG. 3 and (g) of FIG. 6 within a period where the magnitude of the drive voltage is changing. The signals XS and XF generated by the judging circuit 79 are supplied to the decoder 59 of the largest limiter value determining circuit 50, which is described above by referring to FIG. 8, while the signal BUSY is supplied to the command decoding clock generating section 40 of the motor controller 15 illustrated in FIG. 5.

(Up/Down Counter 61)

Figure 13:
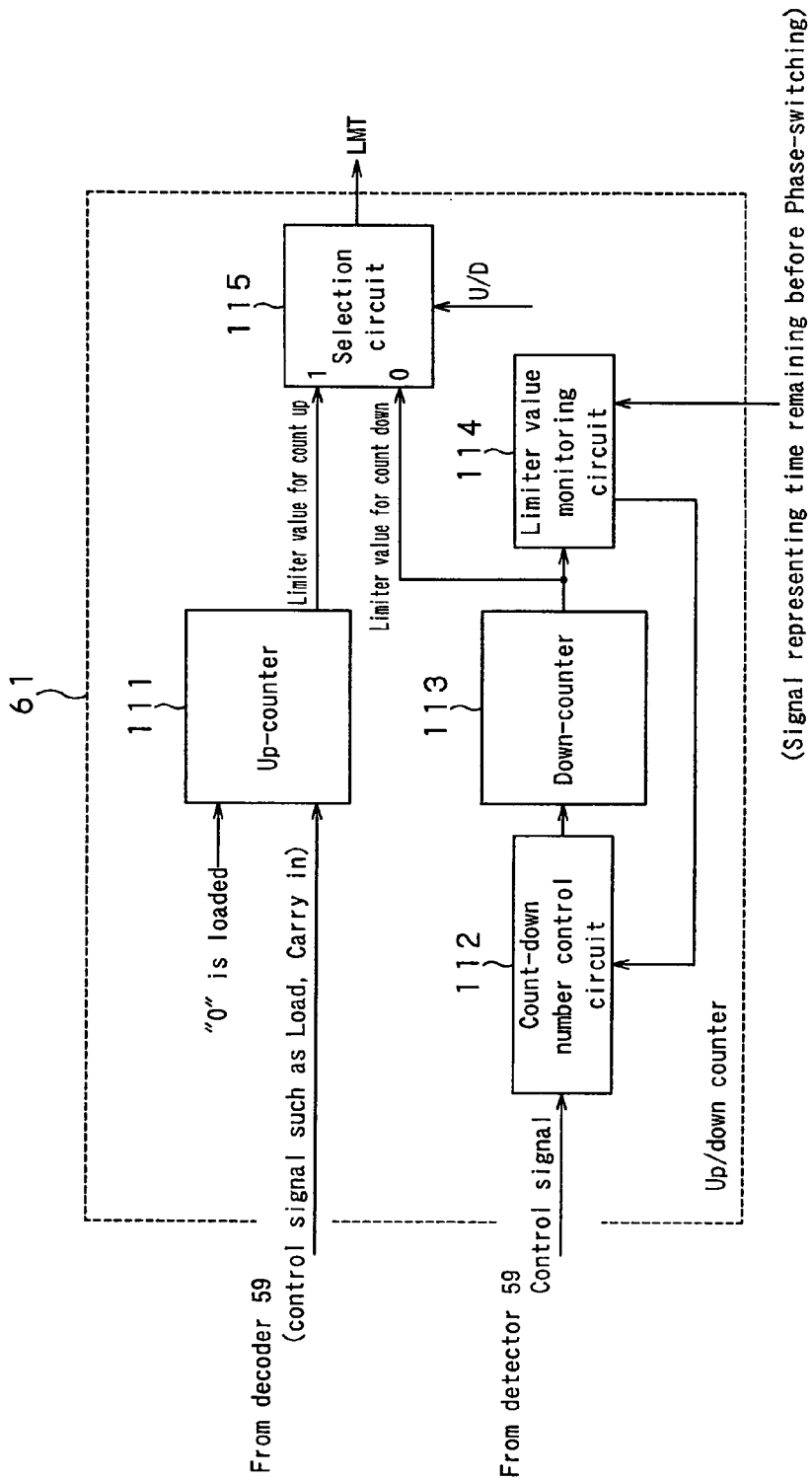
FIG. 13 is a schematic block diagram of the up-counter of the largest limiter value determining circuit of FIG. 8.

Now, the up/down counter 61 shown in FIG. 8 will be described in greater detail by referring to FIG. 13. The up/down counter 61 is a circuit for generating control signal LMT, which is to be used to determine the largest limiter value of the drive voltage VS, and includes an up-counter 111, a count down number control circuit 112, a down-counter 113, a limiter value monitoring circuit 114 and a selection circuit 115.

Figure 14:
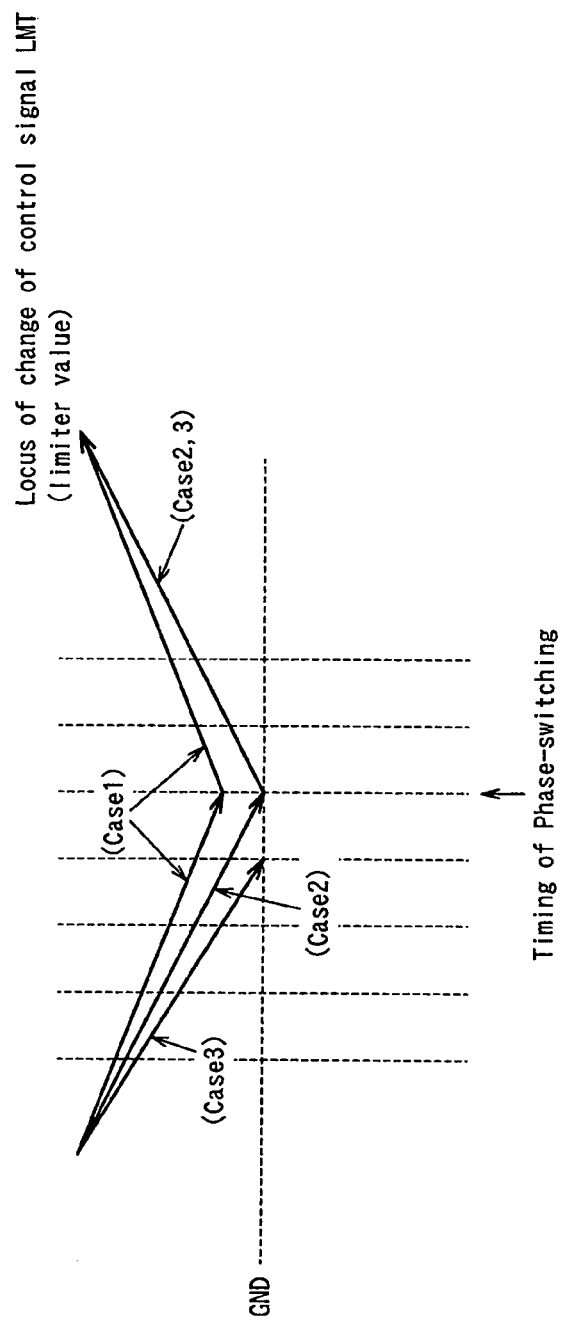
FIG. 14 is a graph illustrating the problems that arise when a soft switching control process is executed in a known disc drive apparatus.

Meanwhile, known up/down counters comprise only a single up/down counter and hence the count signal that is the control signal LMT generated according to the count signal, the duty ratio CVS and the signal U/D and supplied from the decoder 59 shows loci of change as indicated by Cases 1, 2, 3 in FIG. 14.

Figure 15:
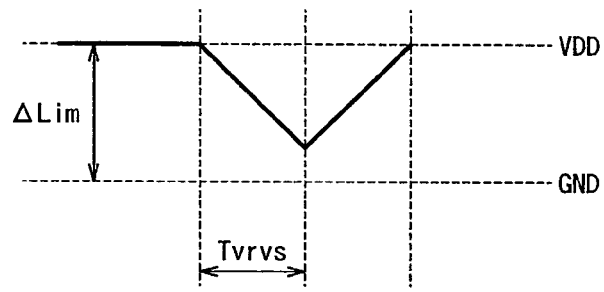
FIG. 15 is a graph illustrating Case 1 that is one of the problems that arise when a soft switching control process is executed in a known disc drive apparatus.

Case 1: This refers to a situation that frequently appears when the master clock frequency of the motor controller 15 is held low in order to suppress the power consumption rate and the spindle motor 3 is driven to rotate at high speed. The processing operation for ΔLim overflows from the period of the transitional time Tvrlm (=transitional time Tvrvs) as shown in FIG. 15 and a phase-switching operation is conducted before the limiter value gets to "0". Therefore, it is not possible to appropriately realize soft switching control in a situation of Case 1.

Case 2: This refers to a situation where the timing of phase-switching agrees with the timing for the limiter value to get to "0". Hence, it is possible to appropriately realize soft switching control.

Figure 16:
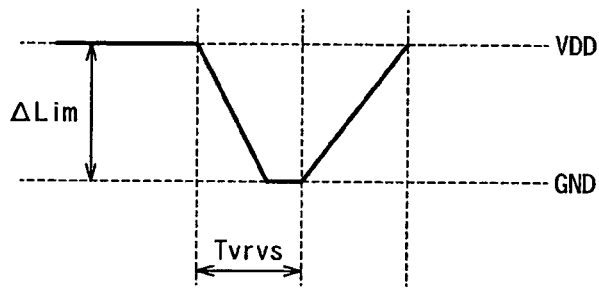
FIG. 16 is a graph illustrating Case 3 that is one of the problems that arise when a soft switching control process is executed in a known disc drive apparatus.

Case 3: This refers to a situation that frequently appears when the rotary speed of the spindle motor 3 is changed. The processing operation for ΔLim is terminated before the transitional time Tvrlm ends as shown in FIG. 16 so that the timing of phase-switching does not agree with the timing for the limiter value to get to "0". Therefore, it is not possible to appropriately realize soft switching control in a situation of Case 3.

It will be clear from the above description that control signal LMT can be generated in a manner as described for Case 1 or Case 3 by means of a conventional up/down counter so that it is not possible to appropriately realize soft switching control.

Figure 17:
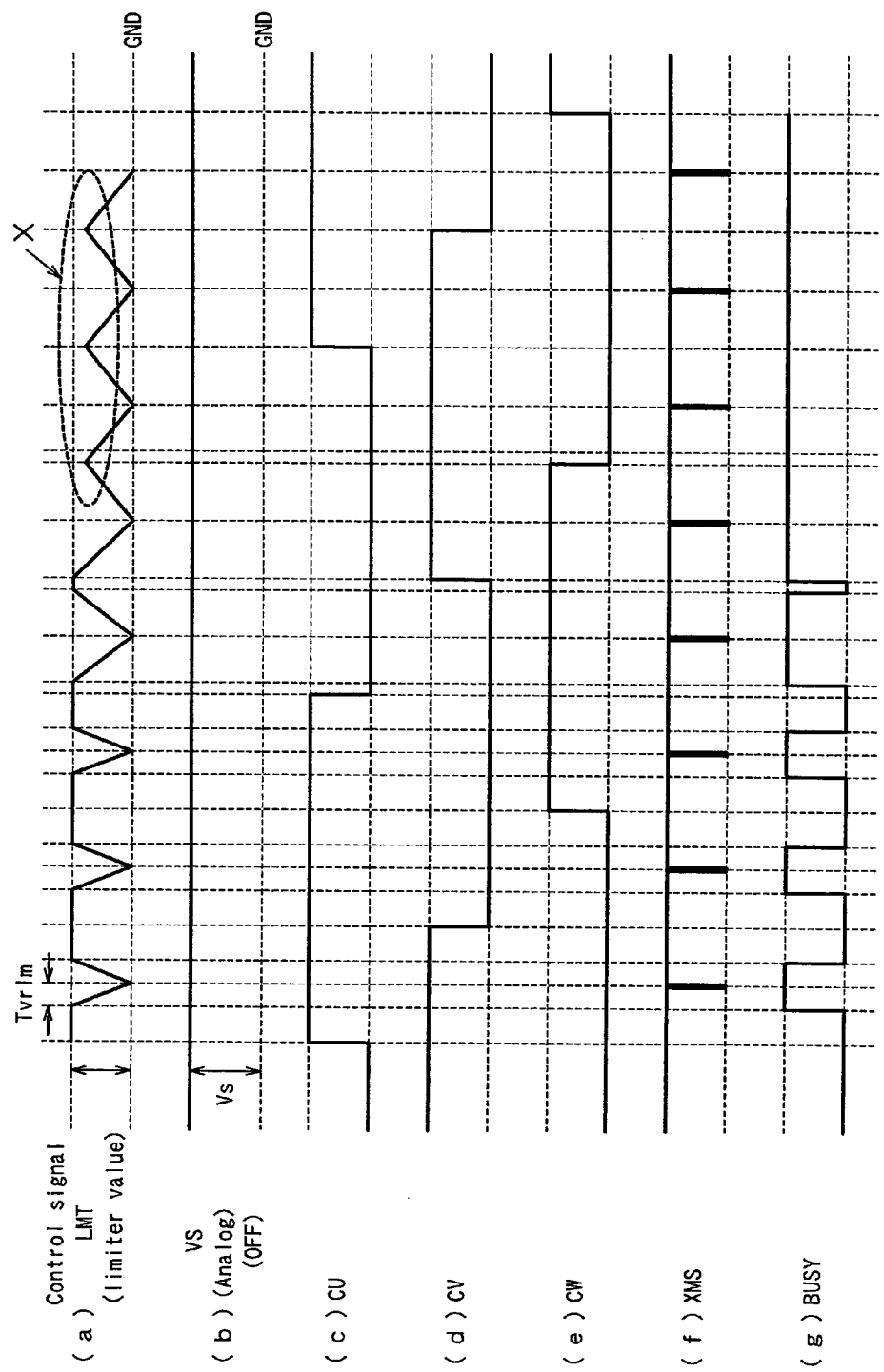
FIG. 17 is a timing chart illustrating the problems that arise when a soft switching control process is executed in a known disc drive apparatus when the motor is driven to rotate at high speed.

Additionally, when the up/down counter comprises only a single up/down counter as described above by referring to conventional up/down counters and the spindle motor 3 is driven to rotate at high speed, the limiter value for a count up period and the limiter value for a count down period can overlap with each other as shown in region X surround by a dotted line in (a) of FIG. 17 to produce not a trapezoidal waveform but a triangular waveform. Then, there arises a problem that it is not possible to supply an electric current sufficient for driving the spindle motor 3. This is a problem that arises because the up/down counter comprises only a single up/down counter. In other words, when the timing for the start of a count down operation comes, the operation has to be started even if a count up operation is still going on because there is only a single up/down counter. In FIG. 17, (b), (c), (d), (e), (f) and (g) respectively indicate drive voltage VS, signal CU, signal CV, signal CW, mask set signal XMS and signal BUSY that are generated when the soft switching operation is off. The signals correspond to (a) of FIG. 17.

To the contrary, the up/down counter 61 of this embodiment of disc drive apparatus comprises two counters including an up-counter 111 and a down-counter 113, which are provided to independently control the limiter value in an count up operation and the limiter value in a count down operation, along with a count down number control circuit 112 and a limiter value monitoring circuit 114, which are provided to avoid Case 1 and Case 3.

When the up/down counter 61 is configured in this way, the decoder 59 arranged upstream as shown in FIG. 8 detects a situation where the processing operation for ΔLim overflows from the period of the transitional time Tvrlm as in Case 1 from the limiter value before the change and the rotary speed of the spindle motor 3 and notifies the MCU 17 of the situation. Generally, the rate of change in the up/down counter, or the rate of change in the limiter value, is limited to 1 per clock at most. On the other hand, when a situation of Case 1 is detected by the decoder 59, the MCU 17 issues a command to the down-counter 113 and the up-counter 111 and controls the rate of change in the limiter value per clock so as to make it read as 2, 4, . . . , for instance. As a result, the limiter value is so selected as to realize a steep slope for a count down operation so that consequently the situation of Case 1 is avoided and the timing of phase-switching is made to agree with the timing of reducing the limiter value to "0".

The up-counter 111 is loaded with limiter value "0" and starts counting it up simultaneously with the timing of phase-switching according to the control signal supplied from the decoder 59 for a count up operation as described above such as count signal Load, Carry in. At this time, the rate of change of the limiter value is controlled by the MCU 17 as described above and, when a situation of Case 1 is detected by the decoder 59, the rate of change per single count up step is made to be not smaller than 2. The limiter value for the count up operation is supplied to the selection circuit 115.

The down-counter 113 starts counting down the limiter value according to the control signal supplied from the decoder 59 for a count down operation as described above. At this time, the rate of change of the limiter value is controlled by the MCU 17 as described above and, when a situation of Case 1 is detected by the decoder 59, the rate of change per single count down step is made to be not smaller than 2. The limiter value for the count down operation is supplied to the limiter value monitoring circuit 114 and the selection circuit 115.

The limiter value monitoring circuit 114 compares the limiter value for the count down operation as supplied from the down-counter 113 with a predetermined threshold value and judges if the limiter value is not smaller than the threshold value. Then, it notifies the count down number control circuit 112 of the outcome of the judgment. This arrangement is provided to automatically avoid a situation where Case 3 arises and also a situation where Case 1 takes place for once and the count down number of the down-counter 113 is made to be not smaller than 2 per clock in order to avoid Case 1 but consequently the slope of the limiter value becomes too steep and the limiter value becomes equal to "0" before the transitional time Tvrlm ends as in Case 3.

The count down number control circuit 112 limits the count down operation of the downstream down-counter 113 according to the judgment made by the limiter value monitoring circuit 114 on the basis of the threshold value. More specifically, if the outcome of the judgment made by the limiter value monitoring circuit 114 on the basis of the threshold value shows that the limiter value exceeds the threshold value, the count down number control circuit 112 stops the count down operation. If, on the other hand, the outcome of the judgment shows that the limiter value is equal to the threshold value, the count down number control circuit 112 controls the down-counter 113 so as to count down only by 1.

The selection circuit 115 selectively outputs the limiter value from the up-counter 111 or the limiter value from the down-counter 113 according to the signal U/D for controlling the largest value of the drive voltage VS supplied from the timing signal generating section 57.

Figure 18:
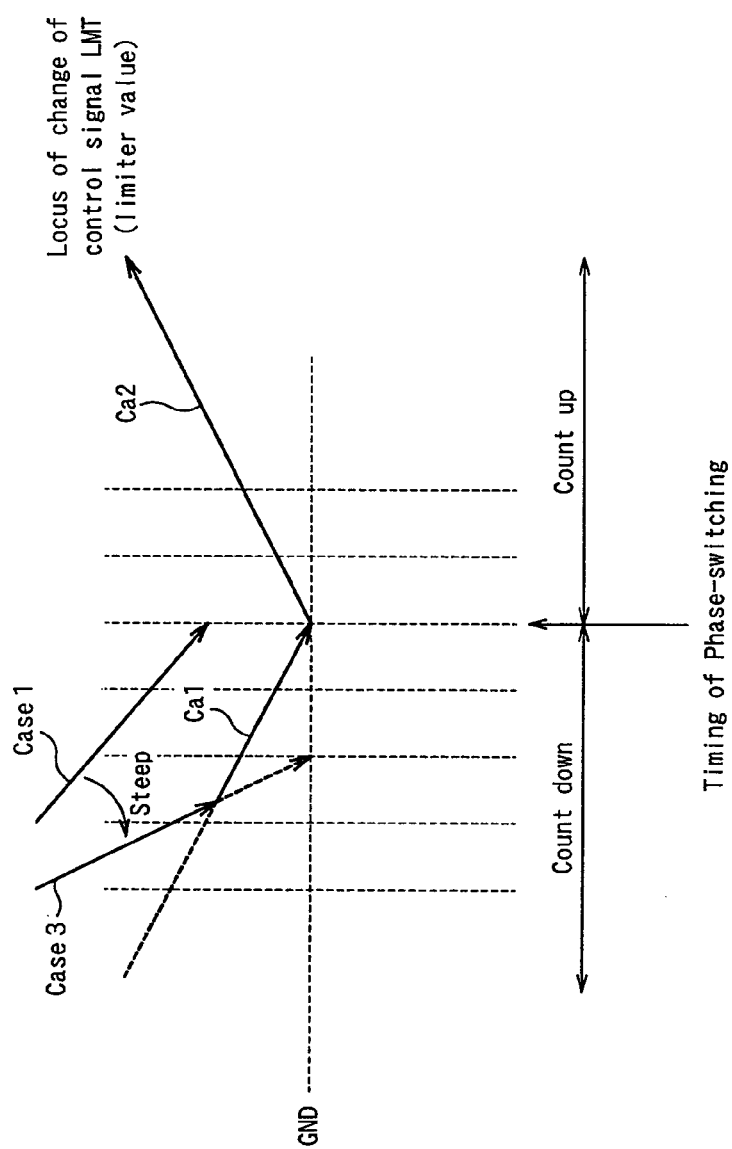
FIG. 18 is a graph illustrating how a soft switching control process is executed in the embodiment of disc drive apparatus of FIG. 1.

Thus, as a situation of Case 1 as shown in FIG. 18 is detected by the decoder 59 in a count down operation of the up/down counter 61 having the above described configuration, the rate of change of the limiter value per clock of the down-counter 113 is increased to make the slope steep by the MCU 17. At this time, the count down number control circuit 112 is so controlled as to avoid a situation of Case 3 as shown in FIG. 18 and, if a situation of Case 3 occurs, the count down number control circuit 112 is controlled according to the judgment made by the limiter value monitoring circuit 114 on the basis of the threshold value in such a way that the count down operation of the down-counter 113 is stopped or limited in order to make the locus of the change in the limiter value automatically show a constant slope Ca1.

On the other hand, the up/down counter 61 comprises the up-counter 111 that is independent from the down-counter 113 and, if a situation of Case 1 or Case 3 takes place, the limiter value is made equal to "0" at the timing of phase-switching for a count up operation and the locus of the change in the limiter value is made to show a constant slope Ca2 as the count up operation is started.

Since the up/down counter 61 comprises the up-counter 111 and the down-counter 113 that are independent from each other, it is possible to avoid the problem that the limiter value for a count up period and the limiter value for a count down period overlap with each other as shown in region X surround by a dotted line in (a) of FIG. 17 to produce a triangular waveform for the drive voltage VS and consequently the electric current is not sufficiently supplied to the spindle motor 3 when the spindle motor 3 is driven to rotate at high sped.

Figure 19:
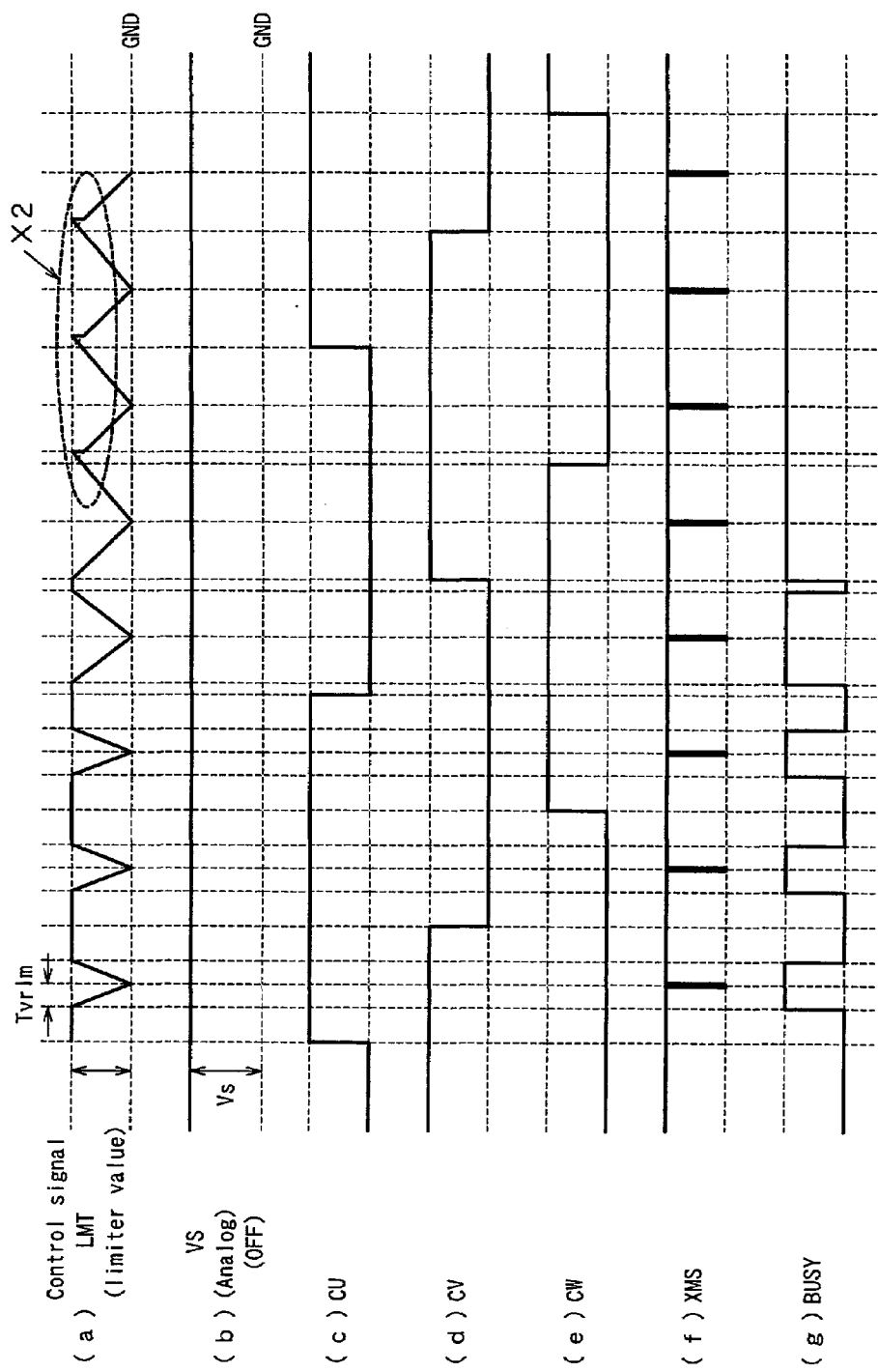
FIG. 19 is a timing chart illustrating how a soft switching control process is executed in the embodiment of disc drive apparatus of FIG. 1 when the motor is driven to rotate at high speed.

More specifically, when overlapping takes place as shown in region X2 in (a) of FIG. 19, the up-counter 111 is driven without stopping its count up operation and, at the same time, the down-counter 113 is made to start a count down operation at the right timing for the operation. At this time, the selection circuit 115 is adapted to output control signal LMT for limiting the drive voltage VS that allows the spindle motor 3 to be supplied with a sufficient electric current by selectively outputting the limiter value for the count up operation in the region where the limiter value for the count up operation supplied from the up-counter 111 and the limiter value for the count down operation supplied from the down-counter 111 overlap with each other. In FIG. 19, (b), (c), (d), (e), (f) and (g) respectively show drive voltage VS for the off-time of soft switching operation, signal CU, signal CV, signal CW, mask set signal XMS and signal BUSY ((Largest Value Limiting Circuit 70))

Now, the largest value limiting circuit 70 of the VS control section 49 will be described by referring to FIG. 20. As shown in FIG. 20, the largest value limiting circuit 70 limits the largest value of the signal SPF that is supplied from the CLV servo circuit 13 in the PWM format according to the control signal LMT generated by the above described largest limiter value determining circuit 50.

The largest value limiting circuit 70 includes a constant output circuit 60, a first detection circuit 63, a selector 64, a second detection circuit 65, a limiter circuit 67, an AND circuit 69 and a flip-flop 71.

The first detection circuit 63 detects the edge (rising edge) of transition from a low level to a high level of the signal SPF supplied in the PWM format and supplies a low level signal XPFS to the limier circuit 67.

The second detection circuit 65 detects the duty ratio of the supplied signal SPF and measures the period during which the signal SPF is at the high level, using the signal XWL supplied from the CLV servo circuit 13 as counter load signal. Then, the second detection circuit 65 outputs the outcome of the measurement as signal SVS.

The selector 64 supplies the control signal LMT generated by the largest limiter value determining circuit 50 to the limiter circuit 67 when activating soft switching control and a constant signal having a constant value and generated by the constant output circuit 62 also to the limiter circuit 67 when deactivating soft switching control.

The limiter circuit 67 is a circuit for limiting the duty ratio of the PWM signal. It contains a VS limiter counter to limit the largest value of the drive voltage. The VS limiter counter inputs the supplied control signal SLMT as load value and outputs the high level signal SGT until the counted value gets to the predetermined value but it makes the signal SGT to move to the low level once the count value gets to the predetermined value.

The AND circuit 69 supplies the signal SPF to the flip-flop 71 only when the signal SPF, which is otherwise supplied to the first detection circuit 63, is lower than the largest value of the defined drive voltage because it is deactivated during the period when the supplied signal SGT is held to a low level.

As a result of the above-described operation, the largest value limiting circuit 70 outputs a drive voltage VS showing a value not greater than the above described largest value from the flip-flop 71.

(Limiter Circuit)

Figure 21:
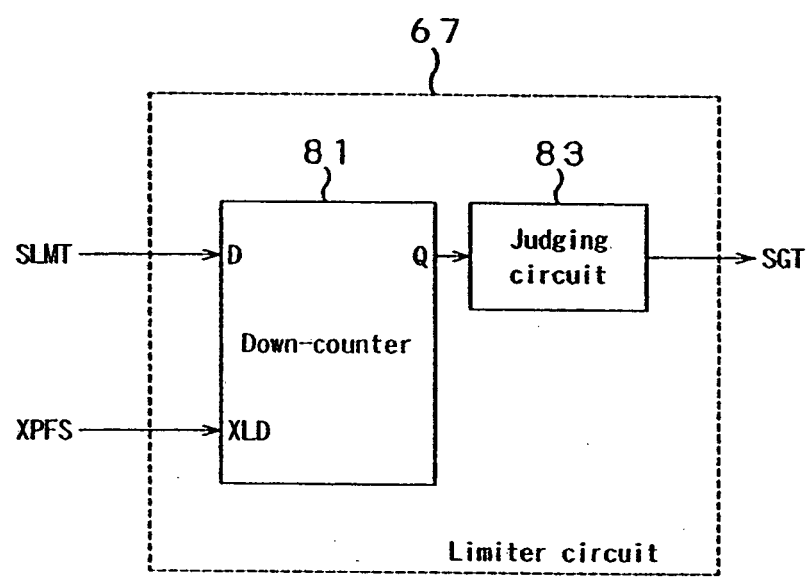
FIG. 21 is a schematic block diagram of the limiter circuit of the largest value limiting circuit of FIG. 20.

FIG. 21 is a schematic block diagram of the limiter circuit 67 of the largest value limiting circuit 70 of FIG. 20. As shown in FIG. 21, the limiter circuit 67 includes a down-counter 81 connected to the selector 64 and the first detection circuit 63 and a judging circuit 83 connected to the down-counter 81. The judging circuit 83 judges if the count value of the down-counter 81 gets to a predetermined value or not and outputs a low level signal SGT at the time when the count value gets to the predetermined value.

In this way, this embodiment of disc drive apparatus can reduce the noise particularly when the spindle motor 3 is driven to rotate at high speed and also the spike noise that is generated at the time of phase-switching.

Additionally, this embodiment of disc drive apparatus can reduce the noise of the motor because, if motor drivers according to the invention are manufactured with variances in the manufacturing process, each of them can drive a motor appropriately to accommodate the variance and realize soft switching control.

Still additionally, this embodiment of disc drive apparatus comprises a motor controller 15 that includes a largest limiter value determining circuit 50 and a largest value limiting circuit 70 in order to control the magnitude of signal SPF in the PWM format that is generated by a CLV servo circuit 13 as shown in FIG. 1 so that it is adapted to raise the degree of integration of circuits and realize so-called soft switching by means of a digital circuit. Furthermore, it is possible to reduce the cost of manufacturing the disc drive apparatus as a result of the high degree of integration.

Still additionally, since the above-described embodiment of disc drive apparatus can easily regulate the control of the spindle motor 3 by means of the software to be executed by the MCU 17 or the like, it is possible to raise the adaptability of the disc drive apparatus to a variety or purposes.

Still additionally, the VS control section 49 of the motor controller 15 can turn on/off the switching control according to the command supplied from the MCU 17 by means of software, it is possible to raise the degree of freedom of controlling the spindle motor 3 with ease.

Finally, since the rate of change in the count up value per clock of the up-counter 111 or in the count down value per clock of the down-counter 113 of the up/down counter 61 can be raised arbitrarily, it is possible to realize soft switching control even in a situation of Case 1 that appears when the master clock frequency of the motor controller 15 is held low in order to suppress the power consumption rate and therefore, according to the invention, it is possible to drive the spindle motor 3 to rotate at high speed so as to reduce the noise of the spindle motor 3 while keeping a low power consumption rate.

While the present invention is described above in terms of a disc drive apparatus, the present invention is not limited to a disc drive apparatus and can equally be applied to any apparatus adapted to drive a motor to rotate by means of a direct PWM system in order to reduce the noise largest value of the motor by realizing soft switching control.

It should be understood by those skilled in the art that various modifications, combinations, sub-combinations and alterations may occur depending on design requirements and other factors insofar as they are within the scope of the appended claims or the equivalents thereof.

What is claimed is:

1. A disc drive apparatus for driving a disc mounted on it to rotate by means of a motor, the apparatus comprising:
    edge signal generation means for generating an edge signal indicating the timing of phase-switching according to the values of a plurality voltages induced when driving the motor; and
    drive voltage control means for controlling the highest value of the drive voltage for driving the motor according to the edge signal generated by the edge signal generation means;
    the drive voltage control means including as independent means:
    first drive voltage control means for controlling the highest value of the first drive voltage before the timing of phase-switching indicated by the edge signal; and
    second drive voltage control means for controlling the highest value of the second drive voltage after the timing of phase-switching indicated by the edge signal.

2. The disc drive apparatus according to claim 1, wherein
    the first drive voltage control means has down-counting means for down-counting according to a predetermined clock frequency and controlling the largest value of the first drive voltage according to the down-counted number;
    the second drive voltage control means has up-counting means for up-counting according to a predetermined clock frequency and controlling the largest value of the second drive voltage according to the up-counted number;
    the down-counting means being adapted to control the largest value of the first drive voltage by counting the count number for a plurality of times per clock of the predetermined clock frequency at the time of down-counting; and
    the up-counting means being adapted to control the largest value of the second drive voltage by counting the count number of a plurality of times per clock of the predetermined clock frequency at the time of up-counting.

3. The disc drive apparatus according to claim 1, further comprising:
monitor means for monitoring the largest value of the first drive voltage controlled by the first drive voltage control means;
comparator means for comparing the outcome of monitoring by the monitor means and a predetermined threshold value; and
control means for controlling the operation of the first drive voltage control means according to the outcome of comparison by the comparator means.

4. A disc drive apparatus for driving a disc mounted on it to rotate by means of a motor, the apparatus comprising:
a plurality of timing signal generation means for generating respectively a plurality of different timing signals for determining timings of phase-switching the motor; and
drive voltage control means for controlling the highest values of the drive voltages for driving the motor respectively according to the plurality of different timing signals generated respectively by the plurality of timing signal generation means.

5. A motor driver circuit comprising:
edge signal generation means for generating an edge signal indicating the timing of phase-switching according to the values of a plurality voltages induced when driving the motor; and
drive voltage control means for controlling the highest value of the drive voltage for driving the motor according to the edge signal generated by the edge signal generation means;
the drive voltage control means including as independent means:
first drive voltage control means for controlling the highest value of the first drive voltage before the timing of phase-switching indicated by the edge signal; and
second drive voltage control means for controlling the highest value of the second drive voltage after the timing of phase-switching indicated by the edge signal.

6. The motor driver circuit according to claim 5, wherein
the first drive voltage control means has down-counting means for down-counting according to a predetermined clock frequency and controlling the largest value of the first drive voltage according to the down-counted number;
the second drive voltage control means has up-counting means for up-counting according to a predetermined clock frequency and controlling the largest value of the second drive voltage according to the up-counted number;
the down-counting means being adapted to control the largest value of the first drive voltage by counting the count number for a plurality of times per clock of the predetermined clock frequency at the time of down-counting; and
the up-counting means being adapted to control the largest value of the second drive voltage by counting the count number of a plurality of times per clock of the predetermined clock frequency at the time of up-counting.

7. The motor driver circuit according to claim 5, further comprising:
monitor means for monitoring the largest value of the first drive voltage controlled by the first drive voltage control means;
comparator means for comparing the outcome of monitoring by the monitor means and a predetermined threshold value; and
control means for controlling the operation of the first drive voltage control means according to the outcome of comparison by the comparator means.

8. A motor driver circuit comprising:
a plurality of timing signal generation means for generating respectively a plurality of different timing signals for determining timings of phase-switching the motor; and
drive voltage control means for controlling the highest values of the drive voltages for driving the motor respectively according to the plurality of different timing signals generated respectively by the plurality of timing signal generation means.

9. A disc drive apparatus for driving a disc mounted on it to rotate by means of a motor, the apparatus comprising:
an edge signal generation section that generates an edge signal indicating the timing of phase-switching according to the values of a plurality voltages induced when driving the motor; and
a drive voltage control section that controls the highest value of the drive voltage for driving the motor according to the edge signal generated by the edge signal generation section;
the drive voltage control section including as independent sections:
a first drive voltage control section that controls the highest value of the first drive voltage before the timing of phase-switching indicated by the edge signal; and
a second drive voltage control section that controls the highest value of the second drive voltage after the timing of phase-switching indicated by the edge signal.

10. A disc drive apparatus for driving a disc mounted on it to rotate by means of a motor, the apparatus comprising:
a plurality of timing signal generation sections that generate respectively a plurality of different timing signals for determining timings of phase-switching the motor; and
a drive voltage control section that controls the highest values of the drive voltages for driving the motor respectively according to the plurality of different timing signals generated respectively by the plurality of timing signal generation sections.

11. A motor driver circuit comprising:
an edge signal generation section that generates an edge signal indicating the timing of phase-switching according to the values of a plurality voltages induced when driving the motor; and
a drive voltage control section that controls the highest value of the drive voltage for driving the motor according to the edge signal generated by the edge signal generation section;
the drive voltage control section including as independent sections:
a first drive voltage control section that controls the highest value of the first drive voltage before the timing of phase-switching indicated by the edge signal; and a second drive voltage control section that controls the highest value of the second drive voltage after the timing of phase-switching indicated by the edge signal.

12. A motor driver circuit comprising:

a plurality of timing signal generation sections that generate respectively a plurality of different timing signals for determining timings of phase-switching the motor; and a drive voltage control section that controls the highest values of the drive voltages for driving the motor respectively according to the plurality of different timing signals generated respectively by the plurality of timing signal generation sections.

* * * * *